United States Patent
Zhang et al.

(10) Patent No.: US 12,301,507 B2
(45) Date of Patent: May 13, 2025

(54) DATA FEEDBACK METHOD AND APPARATUS

(71) Applicant: Huawei Technologies Co., Ltd., Shenzhen (CN)

(72) Inventors: Peng Zhang, Shanghai (CN); Zhengzheng Xiang, Shanghai (CN); Hua Xu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 384 days.

(21) Appl. No.: 17/855,205

(22) Filed: Jun. 30, 2022

(65) Prior Publication Data
US 2022/0368505 A1    Nov. 17, 2022

Related U.S. Application Data

(63) Continuation of application No. PCT/CN2019/130855, filed on Dec. 31, 2019.

(51) Int. Cl.
*H04L 5/00* (2006.01)
*H04L 1/00* (2006.01)
*H04W 76/14* (2018.01)

(52) U.S. Cl.
CPC .......... *H04L 5/0055* (2013.01); *H04L 1/0073* (2013.01); *H04L 5/0048* (2013.01); *H04W 76/14* (2018.02)

(58) Field of Classification Search
CPC ... H04L 5/0048; H04L 5/0055; H04L 1/0073; H04W 76/14

USPC .......................................................... 370/329
See application file for complete search history.

(56) References Cited

U.S. PATENT DOCUMENTS

| | | | |
|---|---|---|---|
| 11,452,078 B2* | 9/2022 | Cao | H04W 4/46 |
| 11,570,757 B2* | 1/2023 | Panteleev | H04W 40/246 |
| 11,652,582 B2* | 5/2023 | Yang | H04L 1/1614 |
| | | | 370/329 |
| 11,671,965 B2* | 6/2023 | Hui | H04L 1/1864 |
| | | | 370/329 |
| 11,671,973 B2* | 6/2023 | Rudolf | H04W 72/23 |
| | | | 370/329 |

(Continued)

FOREIGN PATENT DOCUMENTS

| CN | 101924609 A | 12/2010 |
|---|---|---|
| CN | 103826222 A | 5/2014 |

(Continued)

*Primary Examiner* — Peter G Solinsky
(74) *Attorney, Agent, or Firm* — Leydig, Voit & Mayer, Ltd.

(57) ABSTRACT

A data feedback method is described. The method includes a second terminal sending first feedback information to a first terminal based on a sidelink. The first terminal determines, based on a receiving result of the first terminal for first data and a receiving result that is of the second terminal and that is indicated by the first feedback information, second feedback information that is sent to a network device. In this way, an energy saving requirement of the second terminal is met. Moreover, the described method ensures the network device can also determine receiving results of the first terminal and the second terminal based on the second feedback information, thereby reducing unnecessary operations performed by the network device.

16 Claims, 9 Drawing Sheets

(56) References Cited

U.S. PATENT DOCUMENTS

| | | | |
|---|---|---|---|
| 11,716,786 B2* | 8/2023 | Lee | H04W 88/04 |
| | | | 370/329 |
| 11,722,262 B2* | 8/2023 | Chae | H04L 1/1664 |
| | | | 370/329 |
| 11,758,546 B2* | 9/2023 | Park | H04W 72/21 |
| | | | 370/329 |
| 11,985,719 B2* | 5/2024 | Lee | H04W 4/08 |
| 11,991,641 B2* | 5/2024 | Xue | H04W 72/21 |
| 2012/0327760 A1 | 12/2012 | Du et al. | |
| 2016/0036565 A1 | 2/2016 | Maaref et al. | |
| 2019/0082428 A1 | 3/2019 | Maaref et al. | |
| 2022/0116996 A1* | 4/2022 | Lee | H04W 74/0816 |
| 2022/0141849 A1* | 5/2022 | Lee | H04L 1/1812 |
| | | | 370/329 |
| 2022/0167192 A1* | 5/2022 | Lee | H04L 5/0053 |
| 2023/0063048 A1* | 3/2023 | Fu | H04W 76/14 |
| 2023/0099975 A1* | 3/2023 | Hahn | H04W 72/25 |
| | | | 370/329 |
| 2023/0145519 A1* | 5/2023 | Yi | H04W 72/21 |
| | | | 370/329 |
| 2023/0224907 A1* | 7/2023 | Lee | H04W 4/40 |
| | | | 370/329 |
| 2024/0048284 A1* | 2/2024 | Lee | H04L 1/1822 |
| 2024/0090071 A1* | 3/2024 | Xu | H04W 4/70 |

FOREIGN PATENT DOCUMENTS

| | | |
|---|---|---|
| CN | 105874794 A | 8/2016 |
| CN | 109217988 A | 1/2019 |
| CN | 110100462 A | 8/2019 |
| CN | 110519022 A | 11/2019 |
| EP | 3627717 A1 | 3/2020 |
| WO | 2012052911 A1 | 4/2012 |
| WO | 2018233470 A1 | 12/2018 |

* cited by examiner

DATA FEEDBACK METHOD AND APPARATUS

CROSS-REFERENCE TO RELATED APPLICATIONS

This application is a continuation of International Application No. PCT/CN2019/130855, filed on Dec. 31, 2019, the disclosure of which is hereby incorporated by reference in its entirety.

TECHNICAL FIELD

This application relates to the field of wireless communication technologies, and in particular, to a data feedback method and apparatus.

BACKGROUND

User cooperation is one of the features mainly supported by a next-generation communication system, can significantly increase a system capacity and network coverage, and can reduce load at a base station end. For one target terminal device, there may be at least one cooperation terminal device. The target terminal device may also be referred to as target user equipment (TUE), and the cooperation terminal device may also be referred to as cooperation user equipment (CUE).

A base station may send data to the TUE and the cooperation UE of the TUE. The TUE and the CUE separately decode (or referred to as decipher) data received by the TUE and the CUE. Then, the TUE and the CUE notify the base station of respective decoding results on a feedback channel. The decoding results may be hybrid automatic repeat request (hybrid automatic repeat request, HARQ) information. If the decoding is correct, the HARQ information is an ACK; otherwise, the HARQ information is a NACK. The base station determines whether to resend (that is, retransmit) the data based on the received HARQ. If the HARQ information is an ACK, the base station does not need to resend the data to the TUE. If the HARQ information is a NACK, the base station needs to resend the data to the TUE.

In some scenarios, the TUE has a transmit power saving requirement, and cannot feed back a decoding result to the base station. For example, when a small wearable device serves as TUE to feed back a decoding result to a base station once, large power is consumed. Consequently, remaining power cannot support a user in normally using the TUE. For this type of device, regardless of whether this type of device correctly receives data or correctly decodes the data, the base station repeatedly sends the data to this type of device until a preset quantity of retransmission times is reached. This scenario causes a waste of transmission resources.

SUMMARY

This application provides a data feedback method and apparatus, to save transmission resources when data is retransmitted to a terminal having a transmit power saving requirement in a user cooperation scenario.

According to a first aspect, an embodiment of this application provides a data feedback method, where the method may be applied to a first terminal, and the method includes: A first terminal receives first feedback information from a second terminal, where the first feedback information is used to indicate a receiving result of the second terminal for first data from a network device. The first data is sent by the network device for the second terminal. The first terminal sends second feedback information to the network device, where the second feedback information is determined by the first terminal based on the first feedback information and a receiving result of the first terminal for the first data.

In the foregoing design, the second terminal sends the first feedback information to the first terminal based on a sidelink, and the first terminal determines, based on the first feedback information, a receiving result of the second terminal, and determines, based on the receiving result of the first terminal and the receiving result of the second terminal, the second feedback information sent to the network device. In this way, an energy saving requirement of the second terminal is met, and that the network device can also determine receiving results of the first terminal and the second terminal based on the second feedback information is also ensured, to prevent unnecessary operations performed by the network device. In terms of a volume of electronic devices having an energy saving requirement, the technical solution of this application can effectively reduce resource waste caused by repeatedly sending the first data to TUE by the network device when the network device cannot determine a receiving result of the TUE.

In a possible design, the receiving result includes at least one of the following: successful receiving or unsuccessful receiving.

In a possible design, the second feedback information is a bit position including at least two bits, where at least one bit in the bit position is used to indicate a receiving result of the first terminal for the first data, and another at least one bit in the bit position is used to indicate the receiving result of the second terminal for the first data.

In a possible design, the second feedback information is an index corresponding to a combination of the receiving result of the second terminal for the first data and the receiving result of the first terminal for the first data.

In a possible design, the method further includes: the first terminal determines, based on a first correspondence, an index corresponding to a combination of the receiving result of the first terminal for the first data and the receiving result of the second terminal for the first data, where the first correspondence includes a correspondence between each index and each combination of a possible receiving result of the first terminal and a possible receiving result of the second terminal.

In a possible design, that a first terminal receives first feedback information from a second terminal includes: The first terminal receives SL (sidelink, sidelink) resource configuration information from the network device, and determines an SL resource based on the SL resource configuration information. The first terminal receives the first feedback information from the second terminal by using the SL resource.

Based on the foregoing design, sending the first feedback information to the first terminal by the second terminal can reduce transmit power in comparison with sending the first feedback information to the network device by the second terminal, and is a data feedback manner that saves more power, to meet an energy saving requirement of the second terminal.

In a possible design, the SL resource configuration information is used to indicate a first time interval of the SL resource. The first time interval is an interval between a time domain position of the first data and a time domain position of the SL resource, or the first time interval is an interval between a time domain position of the SL resource configuration information and a time domain position of the SL resource, or the first time interval is an interval between a time domain position of scheduling information of the first data and a time domain position of the SL resource.

Based on the foregoing design, the first time interval of the SL resource is indicated by using the SL resource configuration information. Specifically, the first time interval may be a time interval between a first specified position of the SL resource and a second specified position of another channel, and the another channel may be a channel carrying the first data, or a channel carrying control information used to schedule the first data. For example, the first time interval is a time interval between a start time domain position of the SL resource and a start time domain position of the channel carrying the first data. Correspondingly, the first terminal and the second terminal can determine a start time domain position of an SL resource used to transmit the first feedback information based on the start time domain position of the channel carrying the first data and the first time interval, so that the SL resource used to transmit the first feedback information is provided to the first terminal and the second terminal.

In a possible design, that a first terminal receives first feedback information from a second terminal includes: The first terminal receives uplink time-frequency resource configuration information from the network device, and determines an uplink time-frequency resource based on the uplink time-frequency resource configuration information. The first terminal sends the second feedback information to the network device by using the uplink time-frequency resource.

In a possible design, the uplink time-frequency resource configuration information is used to indicate a second time interval of the uplink time-frequency resource, where the second time interval is an interval between the time domain position of the first data and a time domain position of the uplink time-frequency resource, or the second time interval is an interval between a time domain position of the uplink time-frequency resource configuration information and a time domain position of the uplink time-frequency resource, or the second time interval is an interval between the time domain position of the scheduling information of the first data and a time domain position of the uplink time-frequency resource, or the second time interval is an interval between a time domain position of the first feedback information and a time domain position of the uplink time-frequency resource.

According to a second aspect, an embodiment of this application provides a data feedback method, where the method may be applied to a second terminal, and the method includes: The second terminal receives first data from a network device. The second terminal sends first feedback information to a first terminal, where the first feedback information is used to indicate a receiving result of a second terminal for the first data. The first terminal is a cooperation terminal of the second terminal, and is configured to receive first data from the network device by using the transceiver unit. A destination end of the first data is the second terminal.

In the foregoing design, the second terminal sends the first feedback information to the first terminal over the sidelink, where the first feedback information is used to indicate a receiving result of the first terminal for the first data, so that the first terminal can determine the second feedback information based on the receiving result of the first terminal and the receiving result of the first terminal for the first data, and sends the second feedback information to the network device, to meet an energy saving requirement of the second terminal. In addition, when the second terminal unsuccessfully receives the second feedback information, the second terminal can indirectly notify the network device, and re-receive the first data from the network device or the first terminal, to ensure normal running of the second terminal.

In a possible design, the receiving result includes at least one of the following: successful receiving or unsuccessful receiving.

In a possible design, before that the second terminal sends first feedback information to a first terminal, the method further includes: The second terminal receives SL resource configuration information from the network device, and determines an SL resource based on the SL resource configuration information.

That the second terminal sends first feedback information to a first terminal includes: The second terminal sends the first feedback information to the first terminal by using the SL resource.

In a possible design, the SL resource configuration information is used to indicate a first time interval of the SL resource. The first time interval is an interval between a time domain position of the first data and a time domain position of the SL resource, or the first time interval is an interval between a time domain position of the SL resource configuration information and a time domain position of the SL resource, or the first time interval is an interval between a time domain position of scheduling information of the first data and a time domain position of the SL resource.

According to a third aspect, an embodiment of this application provides a data feedback method, where the method may be applied to a network device, and the method includes: The network device sends first data, where a destination end of the first data is a second terminal. The network device receives second feedback information of a first terminal, where the second feedback information is determined by the first terminal based on first feedback information sent by the second terminal to the first terminal and a receiving result of the first terminal for the first data, and the first feedback information is used to indicate a receiving result of the second terminal for the first data.

In a possible design, the receiving result includes at least one of the following: successful receiving or unsuccessful receiving.

In a possible design, the network device sends SL resource configuration information to the first terminal and the second terminal, where the SL resource configuration information is used to indicate a first time interval of an SL resource, and the SL resource is used to carry the first feedback information. The first time interval is an interval between a time domain position of the first data and a time domain position of the SL resource, or the first time interval is an interval between a time domain position of the SL resource configuration information and a time domain position of the SL resource, or the first time interval is an interval between a time domain position of scheduling information of the first data and a time domain position of the SL resource.

In a possible design, before the network device receives the second feedback information of the first terminal, the method further includes: the network device sends uplink time-frequency resource configuration information to the second terminal, where the uplink time-frequency resource configuration information is used to indicate a second time interval of an uplink time-frequency resource, and the uplink time-frequency resource is used to carry the second feedback information. The second time interval is an interval between the time domain position of the first data and a time domain position of the uplink time-frequency resource, or the second time interval is an interval between a time domain position of the uplink time-frequency resource configuration information and a time domain position of the uplink time-frequency resource, or the second time interval is an interval between the time domain position of the scheduling information of the first data and a time domain position of the uplink time-frequency resource, or the second time interval is an interval between a time domain position of the first feedback information and a time domain position of the uplink time-frequency resource.

In a possible design, that the network device receives second feedback information of a first terminal further includes: The network device determines, based on the second feedback information, whether the second terminal needs to re-receive the first data.

In a possible design, that the network device determines, based on the second feedback information, whether the second terminal needs to re-receive the first data includes:

If the second feedback information indicates that the second terminal successfully receives the first data, the network device determines that the second terminal does not need to re-receive the first data. If the second feedback information indicates that the second terminal does not successfully receive the first data, and the first terminal successfully receives the first data, the network device determines that the second terminal needs to re-receive the first data, and the method further includes: The network device sends first indication information to the first terminal, where the first indication information is used to indicate the first terminal to send the first data to the second terminal. If the second feedback information indicates that the second terminal does not successfully receive the first data, and the first terminal does not successfully receive the first data, the network device determines that the second terminal needs to re-receive the first data, and the method further includes: The network device sends the first data to the first terminal.

According to a fourth aspect, an embodiment of this application provides a communication apparatus. The communication apparatus has a function of implementing the first terminal device in any one of the first aspect or the possible designs of the first aspect, or has a function of implementing the second terminal device in any one of the second aspect or the possible designs of the second aspect. The communication apparatus may be a terminal device, for example, a handheld terminal device or a vehicle-mounted terminal device; or may be an apparatus, for example, a chip, included in the terminal device; or may be an apparatus including the terminal device. A function of the foregoing terminal device may be implemented by hardware, or may be implemented by hardware by executing corresponding software. The hardware or the software includes one or more modules corresponding to the foregoing function.

The communication apparatus may also have a function of implementing the network device in any one of the third aspect or the possible designs of the third aspect. The communication apparatus may be a network device, for example, a base station; or may be an apparatus, for example, a chip, included in the network device. A function of the network device may be implemented by hardware, or may be implemented by hardware by executing corresponding software. The hardware or the software includes one or more modules or units corresponding to the foregoing function.

In a possible design, a structure of the communication apparatus includes a processing unit and a transceiver unit. The processing unit is configured to support the communication apparatus in performing a corresponding function in any one of the first aspect or the designs of the first aspect, performing a corresponding function in any one of the second aspect or the designs of the second aspect, or performing a corresponding function in any one of the third aspect or the designs of the third aspect. The transceiver unit is configured to support communication between the communication apparatus and another communication device. For example, when the communication apparatus is a first terminal, the communication apparatus may receive first feedback information from a second terminal, and receive first data from a network device. The communication apparatus may further include a storage module. The storage module is coupled to the processing unit, and stores program instructions and data that are necessary for the communication apparatus. In an example, the processing unit may be a processor, a communication module may be a transceiver, and the storage module may be a memory. The memory may be integrated with the processor, or may be disposed separately from the processor. This is not limited in this application.

In another possible design, a structure of the communication apparatus includes a processor, and may further include a memory. The processor is coupled to the memory, and may be configured to execute computer program instructions stored in the memory, so that the communication apparatus performs the method in any one of the first aspect or the possible designs of the first aspect, performs the method in any one of the second aspect or the possible designs of the second aspect, or performs the method in any one of the third aspect or the possible designs of the third aspect. Optionally, the communication apparatus further includes a communication interface, and the processor is coupled to the communication interface. When the communication apparatus is a terminal device, the communication interface may be a transceiver or an input/output interface. When the communication apparatus is a chip included in the terminal device, the communication interface may be an input/output interface of the chip. Optionally, the transceiver may be a transceiver circuit, and the input/output interface may be an input/output circuit.

According to a fifth aspect, an embodiment of this application provides a chip system, including a processor, where the processor is coupled to a memory. The memory is configured to store a program or instructions. When the program or the instructions are executed by the processor, the chip system is enabled to implement the method in any possible design of the first aspect, the method in any possible design of the second aspect, or the method in any possible design of the third aspect.

Optionally, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor such as a read-only memory ROM. The memory and the processor may be integrated into a same chip, or may be separately disposed on different chips. A type of the memory and a manner of disposing the memory and the processor are not specifically limited in this application.

According to a sixth aspect, an embodiment of this application provides a computer-readable storage medium, where the computer storage medium stores computer-readable instructions, and when a computer reads and executes the computer-readable instructions, the computer is enabled to perform the method in any possible design of the first aspect, the method in any possible design of the second aspect, or the method in any possible design of the third aspect.

According to a seventh aspect, an embodiment of this application provides a computer program product. When a computer reads and executes the computer program product, the computer is enabled to perform the method in any possible design of the first aspect, the method in any possible design of the second aspect, or the method in any possible design of the third aspect.

According to an eighth aspect, an embodiment of this application provides a communication system. The communication system includes the network device, the first terminal, and the second terminal.

According to a ninth aspect, an embodiment of this application provides a communication system. The communication system includes the first terminal and the second terminal.

DESCRIPTION OF EMBODIMENTS

Figure 1:
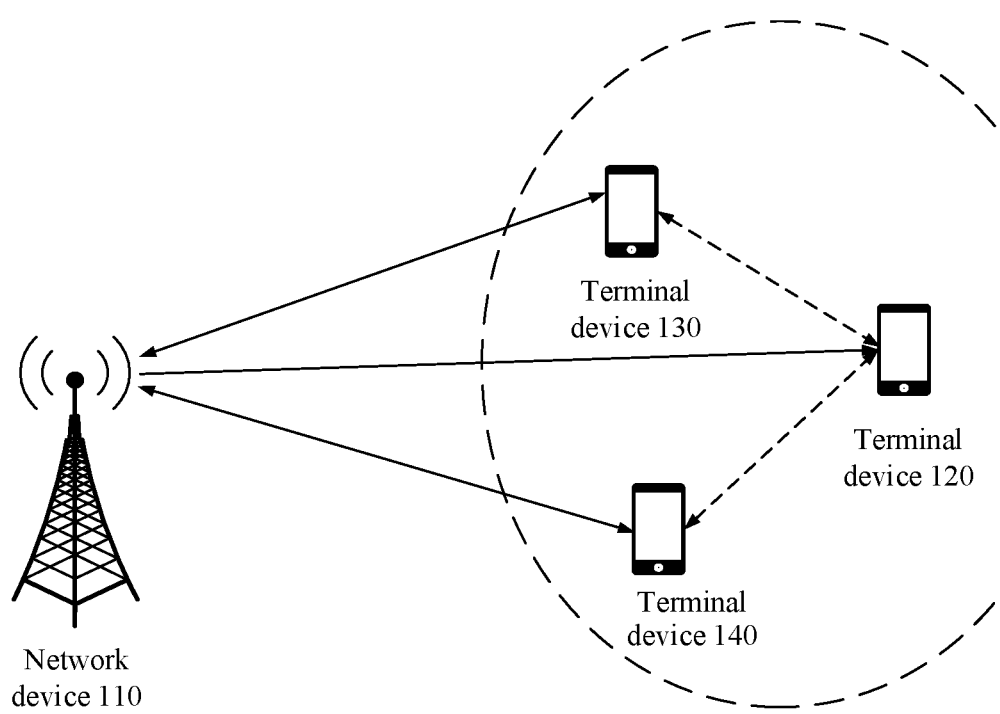
FIG. 1 is a schematic diagram of a network architecture of a communication system to which an embodiment of this application is applicable.

To make objectives, technical solutions, and advantages of this application clearer, the following further describes this application in detail with reference to the accompanying drawings. A specific operation method in method embodiments may also be applied to a device embodiment or a system embodiment. In the description of this application, unless otherwise stated, "a plurality of" means two or more than two.

In the following descriptions, some terms in embodiments of this application are described, to help a person skilled in the art have a better understanding.

(1) Terminal device: The terminal device may also be referred to as user equipment (UE), a mobile station (MS), a mobile terminal (MT), or the like, and is a device that provides voice and/or data connectivity for a user. The terminal device may communicate with a core network through a radio access network (RAN), and exchange voice and/or data with the RAN. For example, the terminal device may be a hand-held device or a vehicle-mounted device that has a wireless connection function. Currently, for example, the terminal device is a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home. The terminal device in embodiments of this application may alternatively be an in-vehicle module, an onboard component, an automotive chip, or an on board unit that is built in a vehicle as one or more components or units. The vehicle may implement a method in embodiments of this application by using the in-vehicle module, the onboard component, the automotive chip, or the on board unit that is built in the vehicle.

(2) Network device: The network device is a device that is in a network and that is configured to connect a terminal device to a wireless network. The network device may be a node in a radio access network, and may also be referred to as a base station, or may be referred to as a radio access network (RAN) node (or device). The network device may be configured to: mutually convert a received over-the-air frame and an Internet protocol (IP) packet, and serve as a router between the terminal device and a remaining part of the access network. The remaining part of the access network may include an IP network. The network device may further coordinate attribute management of the air interface. For example, the network device may include a long term evolution (LTE) system or an evolved NodeB (eNB, or e-NodeB, evolutional NodeB) in an evolved LTE system (LTE-Advanced, LTE-A); or may include a next generation NodeB (gNB) in a 5th generation (5G) new radioNR) system; or may further include a transmission reception point (TRP), a home base station (e.g., a home evolved NodeB, or a home NodeB, HNB), a baseband unit (BBU), a Wi-Fi access point (AP), or the like; or may further include a centralized unit (CU) and a distributed unit (DU) in a cloud access network (CloudRAN) system. This is not limited in embodiments of this application. For another example, a network device in a V2X technology is a road side unit (RSU). The RSU may be a fixed infrastructure entity supporting a V2X application, and may exchange a message with another entity supporting the V2X application.

(3) Terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit which items are included. For example, if at least one of A, B, and C is included, A, B, C, A and B, A and C, B and C, or A, B, and C may be included. Similarly, understanding of description such as "at least one type" is similar. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects, unless otherwise specified.

Unless otherwise stated, ordinal numbers such as "first" and "second" in embodiments of this application are used to distinguish between a plurality of objects, but are not intended to limit a sequence, a time sequence, priorities, or importance of the plurality of objects. In addition, description of "first" and "second" does not necessarily indicate that objects are different.

The foregoing describes some concepts in embodiments of this application. The following describes technical features in embodiments of this application.

User cooperation communication is an effective means to improve a system capacity and network coverage. For one target terminal device, there may be at least one cooperation terminal device. The target terminal device may also be referred to as target user equipment (TUE), and the cooperation terminal device may also be referred to as cooperation user equipment (CUE).

Optionally, the TUE and the at least one CUE may form a user cooperation group. The user cooperation group may be understood as including at least two terminal devices that have a data cooperation transmission relationship, and the at least two terminal devices may be classified into a target terminal device and a cooperation terminal device based on a destination end of data transmission. The cooperation terminal device is a terminal device that can receive, from a network device, data whose destination end is the TUE and forward the data to the TUE. Optionally, when the TUE unsuccessfully receives the data, and the CUE successfully receives the data, the CUE may forward the data to the TUE, to help the TUE successfully receive the data, and improve receiving performance of the TUE.

Specifically, cooperation transmission includes two phases. In the first phase, the network device may send data to the TUE and the CUE of the TUE, for example, in a multicast or broadcast manner.

Then, the TUE and the CUE decode the data received by the TUE and the CUE respectively, and send feedback information to the network device on respective feedback channels, to indicate whether the TUE and the CUE successfully receive the data.

Correspondingly, the network device determines, based on the feedback information sent by the TUE and the CUE, an operation that needs to be performed. For example, if the network device determines that the TUE correctly decodes the data, the network device no longer resends the data to the TUE. If both the CUE and the TUE incorrectly decode the data, the network device resends the data, that is, repeats operation steps of the first phase. If the network device determines that the TUE incorrectly decodes the data and the CUE correctly decodes the data, the network device may indicate the CUE and the TUE to enter the second phase.

In the second phase, the CUE separately sends the received data to the TUE over a sidelink. Before sending the received data to the TUE, the CUE may further perform processing such as amplification, decoding, and compression on the data. This is not limited in this application. In this way, the TUE may perform joint decoding on the data received from the network device in the first phase and the data received from the CUE in the second phase, to improve receiving performance.

In some scenarios, the TUE has a transmit power saving requirement, and cannot send feedback information to the network device. For example, when the TUE is a small wearable device, sending the feedback information to the network device once consumes a large amount of power. Consequently, remaining power cannot support a user in normally using the TUE. The network device cannot learn whether the TUE accurately decodes the data. Consequently, the network device cannot perform a correct operation, and a waste of transmission resources may be caused.

In view of this, this application provides a data feedback method. The TUE sends first feedback information used to indicate a receiving result of first data to the CUE, and the CUE determines second feedback information based on a receiving result of the TUE for the first data and a receiving result of the CUE for the first data, and sends the second feedback information to the network device. Because energy consumption for a manner in which the TUE transmits the first feedback information over the sidelink is lower than that for a manner in which the TUE sends the first feedback information to the network device, it can be ensured that the network device learns of receiving results of the TUE and the CUE for the first data while an energy saving requirement of the TUE is met. If the TUE unsuccessfully receives the first data, the network device can be notified by using the CUE, and the network device indicates the TUE to re-receive the first data from the CUE or the network device, to ensure normal running of the TUE. In addition, when the network device cannot determine the receiving results of the TUE and the CUE, the network device is prevented from performing an unnecessary operation. For example, when the network device does not determine whether the TUE successfully receives the first data, the network device blindly repeatedly sends the first data, and this results in a waste of resources.

The technical solutions of embodiments of this application may be used in various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WIMAX) communication system, and a 5th generation (5G) system or a new radio (NR) system, or is used in a future communication system, for example, a 6G system, or another similar communication system, provided that one entity can initiate paging to another entity. This is not specifically limited. In addition, an air interface communication process between the network device and the terminal device is used as an example in a description process of embodiments of this application. Actually, the technical solutions provided in embodiments of this application may also be applied to a sidelink (SL), provided that one terminal device can initiate paging to another terminal device. For example, the technical solutions provided in embodiments of this application may be applied to a device-to-device (D2D) scenario, an NR D2D scenario, an LTE D2D scenario, or the like; or may be applied to a vehicle to everything (V2X) scenario, an NR V2X scenario, an LTE V2X scenario, or the like, for example, may be applied to an internet of vehicles, such as V2X, LTE-V, and vehicle-to-vehicle (V2V), or may be used in fields such as intelligent driving and intelligent connected vehicles.

Further, embodiments of this application may be further applied to an evolved universal mobile telecommunications system terrestrial radio access network (E-UTRAN) system or a next generation (NG)-RAN system, or may be applied to a next generation communication system or a similar communication system.

FIG. 1 is a schematic diagram of a network architecture of a communication system according to this application. The communication system includes a network device 110, a terminal device 120, a terminal device 130, and a terminal device 140. The terminal device 120 is TUE, and the terminal device 130 and the terminal device 140 are CUEs of the terminal device 120. Optionally, the terminal device 120, the terminal device 130, and the terminal device 140 may form a user cooperation group. In other words, the terminal device 120 is TUE in the user cooperation group, and the terminal device 130 and the terminal device 140 are CUEs in the user cooperation group.

The network device in FIG. 1 may be an access network device, for example, a base station. The access network device corresponds to different devices in different systems. For example, the access network device may correspond to an evolved NodeB (Evolutional Node B, eNB) in a 4th generation mobile communication technology (4th generation, 4G) system, and may correspond to an access network device such as a gNB in 5G in a 5G system.

The user cooperation group in FIG. 1 may include the terminal device 120, the terminal device 130, and the terminal device 140, or may include only the terminal device 120 and the terminal device 130. In other words, one TUE may have one or more CUEs serving the TUE. Optionally, if the TUE and the CUE appear in a form of the user cooperation group, a plurality of different user cooperation groups may exist in one cell. A terminal device may be TUE of a user cooperation group that is centered on the terminal device, or may be CUE of one or more other user cooperation groups.

It should be understood that the terminal device 120, the terminal device 130, and the terminal device 140 shown in FIG. 1 are merely examples, and the network device may provide services for a plurality of terminal devices. A quantity of terminal devices in a communication system is not specifically limited in this application. In addition, the terminal device in FIG. 1 is shown by using a mobile phone as an example, but this application is not limited thereto. The terminal device may alternatively be another type of terminal device, for example, an in-vehicle terminal device or a vehicle. In addition, FIG. 1 is merely a simplified schematic diagram used as an example for ease of understanding. The communication system may further include another network device or another terminal device that is not shown in FIG. 1.

The following describes the technical solutions in embodiments of this application with reference to the accompanying drawings.

The technical solutions of this application may be applied to a wireless communication system (a communication system shown in FIG. 1). The wireless communication system may include at least one network device, at least one TUE, and at least one CUE of the TUE. The network device may communicate with a terminal device (including the TUE and the CUE) through a radio air interface, and the TUE may communicate with the CUE over a sidelink. When the technical solutions of this application are applied to the communication system shown in FIG. 1, the network device in the wireless communication system may correspond to the network device 110 shown in FIG. 1, and the TUE may correspond to the terminal device 120 shown in FIG. 1. The CUE of the TUE may correspond to the terminal device 130 and the terminal device 140 shown in FIG. 1.

Without a loss of generality, the following uses an interaction process between one TUE and one CUE, and an interaction process between one TUE, one CUE and a network device (e.g., the terminal device 120, the terminal device 130 and the network device 110 in FIG. 1, or the terminal device 120, the terminal device 130 and the network device 110 in FIG. 1) as examples to describe embodiments of this application in detail. For unified description, in the following, the CUE (the terminal device 130 or the terminal device 140) is referred to as a first terminal, and the TUE (the terminal device 120) is referred to as a second terminal.

Figure 2:
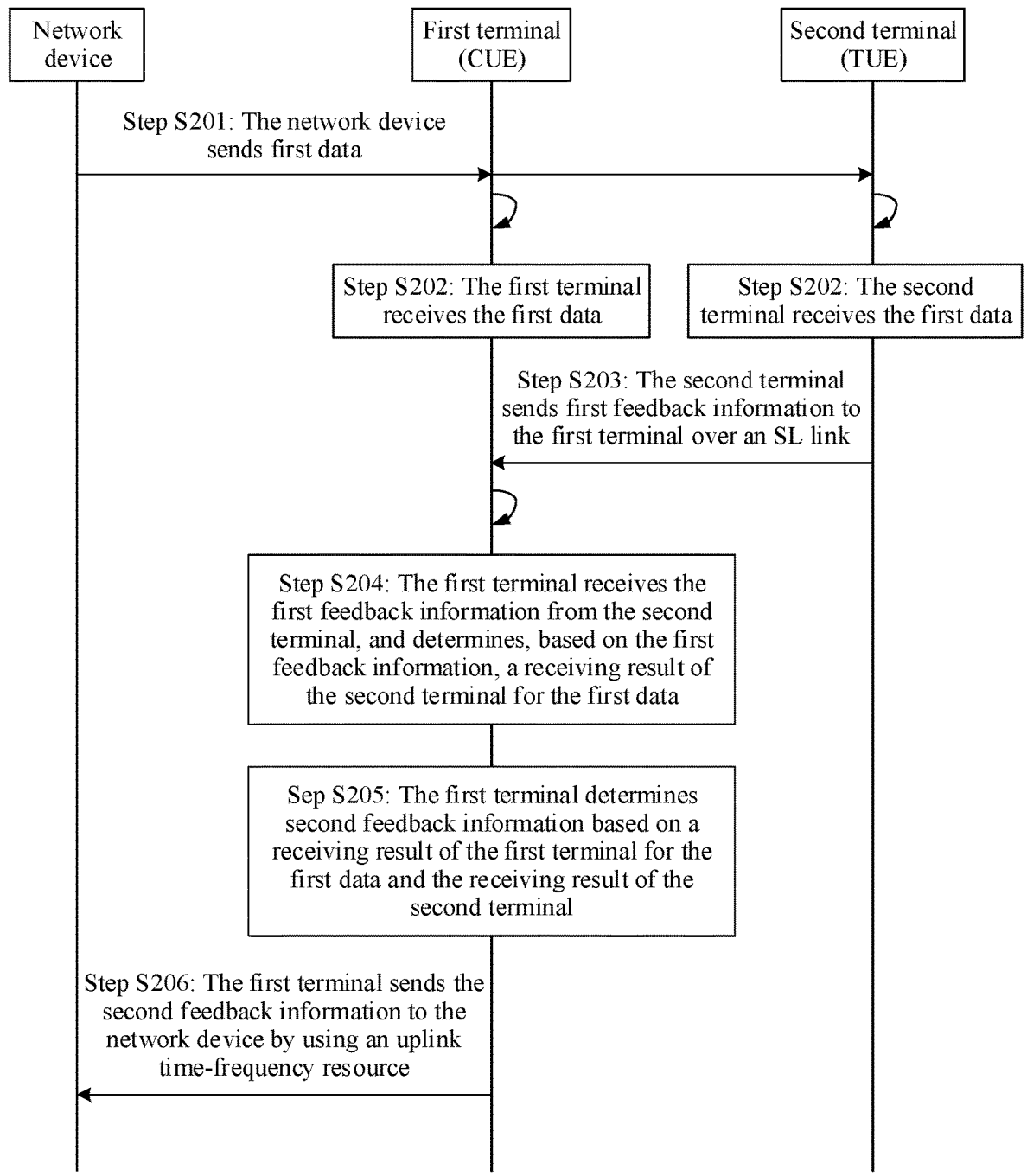
FIG. 2 is a schematic flowchart of a data feedback method according to an embodiment of this application.

FIG. 2 is a schematic flowchart of a data feedback method according to an embodiment of this application. The method may be applied to the communication system shown in FIG. 1. The method includes the following step S201 to step S208.

Step S201: A network device sends first data to a first terminal and a second terminal.

Specifically, the first data may be carried on a downlink data channel, for example, a PDSCH (physical downlink shared channel, physical downlink shared channel).

Step S202: The first terminal and the second terminal separately receive the first data.

The first terminal and the second terminal separately receive the first data, and decode the received first data, to determine receiving results of the first terminal and the second terminal for the first data.

Specifically, the "receiving result" in this embodiment of this application may be successful receiving or unsuccessful receiving. The successful receiving means that the terminal device correctly decodes the first data received from the network device. The unsuccessful receiving means that the terminal device does not receive the first data from the network device, or the terminal device incorrectly decodes the first data received from the network device. It should be understood that a prerequisite for correct decoding is that the terminal device receives the first data.

Step S203: The second terminal sends first feedback information to the first terminal by using an SL resource.

It should be understood that before step S203, the SL resource has been allocated to the first terminal and the second terminal. A manner of allocating the SL resource may be that the network device allocates the SL resource to the second terminal and the second terminal, or may be predetermined in a protocol, or may be that another device allocates the SL resource to the first terminal and the second terminal, or may be known to the first terminal and the second terminal before the procedure is performed. For example, the SL resource is a periodic SL resource, and the SL resource currently used by the first terminal and the second terminal is a previously configured periodic SL resource.

The first feedback information is used to indicate a receiving result of the second terminal for the first data. As described above, the receiving result includes successful receiving and unsuccessful receiving. For example, if the second terminal incorrectly decodes the first data, the receiving result indicated by the first feedback information is unsuccessful receiving. For another example, if the second terminal does not receive the first data, the receiving result indicated by the first feedback information is unsuccessful receiving. For another example, if the second terminal correctly decodes the first data, the receiving result indicated by the first feedback information is successful receiving.

For example, the first feedback information may be HARQ (hybrid automatic repeat request, hybrid automatic repeat request)-ACK (acknowledge character) information. For example, if the receiving result is successful receiving, the first feedback information is an ACK; or if the receiving result is unsuccessful receiving, the first feedback information is a NACK (negative acknowledgement). Specifically, when the TUE sends the first feedback information, the first feedback information may be carried on an SL control channel, for example, on a PSFCH (physical sidelink feedback channel, displayed physical layer channel).

In another example, the first feedback information may alternatively be a no-load message, and the no-load message is used to indicate, to the first terminal, that the receiving result of the second terminal is successful receiving or unsuccessful receiving. For example, the second terminal may alternatively send the no-load message (DTX, discontinuous transmission) by using the SL resource allocated by the network device. The no-load message may be understood as that a transmit end of the no-load message sends no information, and a receive end receives no message. For example, if the no-load message indicates that the second terminal does not successfully receive the first terminal, when the second terminal sends the no-load message on a PSFCH allocated by the network device, that is, when the first terminal does not receive a message on the PSFCH, the first terminal determines that the receiving result of the second terminal is unsuccessful receiving. In this example, signaling overheads is reduced while the second terminal can determine the receiving result of the first terminal.

Step S204: The first terminal receives the first feedback information from the second terminal by using the SL resource.

Step S205: The first terminal determines second feedback information based on a receiving result of the second terminal for the first data indicated by the first feedback information and a receiving result of the first terminal for the first data.

Step S206: The first terminal sends the second feedback information to the network device by using an uplink time-frequency resource.

It should be understood that before step S206, the uplink time-frequency resource has been allocated to the second terminal. A manner of allocating the uplink time-frequency resource may be that the network device allocates the uplink time-frequency resource to the second terminal, or may be predetermined in a protocol, or may be known by the first terminal before the first terminal performs the procedure. For example, the uplink time-frequency resource is a periodic uplink time-frequency resource, and the uplink time-frequency resource currently used by the first terminal is a previously configured periodic uplink time-frequency resource.

The following specifically describes an implementation method shown in FIG. 2 with reference to the accompanying drawings. For ease of understanding, the first terminal is referred to as CUE, and the second terminal is referred to as TUE below.

In the foregoing embodiment, it can be learned from step S200 to step S206 that, the technical solution that is for performing data feedback by the TUE and the CUE and that is provided in embodiments of this application may be summarized into three parts. In the first part, an SL resource is configured for the TUE and the CUE, and the TUE sends, to the CUE by using the SL resource (sidelink), first feedback information used to indicate a receiving result of the TUE for the first data. Correspondingly, as a peer device of the sidelink, the CUE receives the first feedback information from the TUE. In the second part, the network device allocates, to the CUE, an uplink time-frequency resource used to send the second feedback information. In the third part, the CUE determines the second feedback information based on a receiving result of the CUE for the first data and the receiving result of the TUE for the first data, and sends the second feedback information to the network device by using the uplink time-frequency resource configured in the second part.

The following separately describes the foregoing three parts in detail. First, content of the first part is described.

[Part 1]

The TUE and the CUE determine a resource position of the SL resource based on SL resource configuration information, and transmit the first feedback information based on the determined SL resource.

Specifically, the SL resource configuration information may be used to indicate a time domain position of the SL resource. For example, the SL resource configuration information is used to indicate a first time interval of the SL resource, and the first time interval is used to indicate a time interval (or referred to as a timing offset) between a first specified position of the SL resource and a second specified position of another channel.

The first specified position and the second specified position may be a same relative position for different resources, or may be different relative positions. For example, a PUSCH (physical uplink shared channel, physical uplink shared channel) carrying the first data is used as an example. The first time interval may be a time interval between a start position of the SL resource and a start position of the PUSCH carrying the first data. For another example, the first time interval may alternatively be a time interval between a start position of the SL resource and an end position of the PUSCH carrying the first data. The end position is a time domain position at an end moment of the resource. For still another example, the first time interval may alternatively be a time interval between an end position of the SL resource and a start position of the PUSCH carrying the first data.

It should be noted that specific positions of the first specified position and the second specified position are not limited in this embodiment of this application. In addition, in this embodiment of this application, a unit of the first time interval may be a radio frame, a subframe, a slot, a mini-slot, a symbol, or the like. The time unit of the first time interval is not limited in this application.

The following describes in detail a relationship between the SL resource and the first time interval by using specific examples.

Example 1: The first time interval is a time interval between a first specified position of the SL resource and a second specified position of a channel carrying the first data. The first data may be carried on a downlink channel, for example, a PUSCH.

Figure 3A:
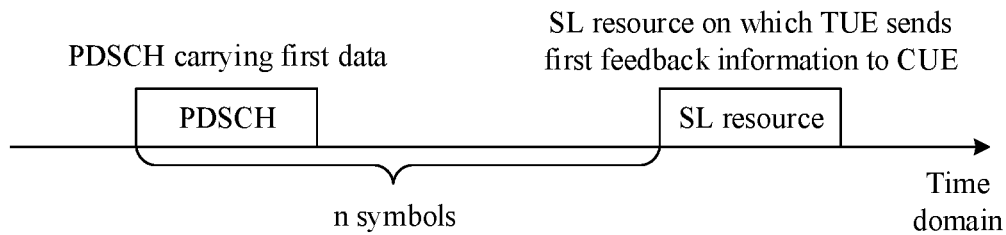
FIG. 3a and FIG. 3b each are a schematic diagram of a scenario of determining an SL resource according to an embodiment of this application.
Figure 3B:
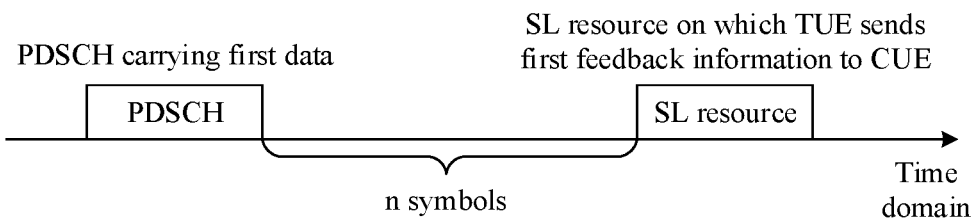

The following uses a PUSCH carrying the first data as an example. FIG. 3a and FIG. 3b each are a schematic diagram of a relationship of a first time interval between an SL resource and a PUSCH according to an embodiment of this application. It is assumed that in scenarios shown in FIG. 3a and FIG. 3b, a time unit of the first time interval is a symbol, and the time interval is n symbols.

In the scenario shown in FIG. 3a, the first time interval of the SL resource is a time interval between a start time domain position of the PUSCH carrying the first data and a start time domain position of the SL resource. In other words, a time deviation between the start time domain position of the PUSCH carrying the first data and the start time domain position of the SL resource is n symbols. Correspondingly, after receiving the SL resource configuration information, the terminal device determines the start time domain position of the SL resource based on the first time interval indicated by the SL resource configuration information and the received start time domain position of the PUSCH carrying the first data.

In the scenario shown in FIG. 3b, the first time interval of the SL resource may alternatively be a time interval between an end position of the PUSCH carrying the first data and a start position of the SL resource. In other words, a time deviation between an end time domain position of the PUSCH carrying the first data and the start time domain position of the SL resource is n symbols. Correspondingly, after receiving the SL resource configuration information, the terminal device determines the start time domain position of the SL resource based on the first time interval indicated by the SL resource configuration information and the received end time domain position of the PUSCH carrying the first data.

Example 2: The first time interval is a time interval between the SL resource and a channel carrying control information used to schedule the first data.

Similarly, the first time interval may be a time interval between the first specified position of the SL resource and the second specified position of the channel carrying the control information. For example, the control information used to schedule the first data is first DCI (downlink control information). The first DCI is carried on a PDCCH (physical downlink control channel). For example, the first time interval may be a time interval between the start time domain position of the SL resource and a start time domain position of the PDCCH carrying the first DCI. For another example, the time interval may alternatively be a time interval between the start time domain position of the SL resource and an end time domain position of the PDCCH. For a relationship of the time interval between the SL resource and the PDCCH carrying the first DCI, refer to the specific descriptions in the foregoing example 1, FIG. 3a, or FIG. 3b. Details are not described herein again.

Example 3: The first time interval is a time interval between the SL resource and a channel carrying the SL resource configuration information.

In this embodiment of this application, there are a plurality of manners for configuring the SL resource. For example, physical layer signaling carries the SL resource configuration information, and the network device configures the SL resource for the TUE and the CUE by using the physical layer signaling (for details, refer to descriptions of configuration manner 1 below). For another example, RRC (radio resource control, radio resource control) signaling carries the SL resource configuration information, and the network device configures the SL resource for the TUE and the CUE by using the RRC signaling (for details, refer to descriptions of configuration manner 2 below). A manner for configuring the SL resource is described in detail in the following.

For example, the network device configures the SL resource by using second DCI. For example, if the SL resource configuration information is carried in the second DCI, and the second DCI is carried on a PDCCH, the first time interval may be a time interval between the first specified position of the SL resource and a second specified position of the PDCCH carrying the second DCI. For example, the time interval is a time interval between a start position of the SL resource and a start time domain position of the PDCCH carrying the second DCI. For another example, the time interval is a time interval between the start time domain position of the SL resource and an end time domain position of the PDCCH carrying the second DCI. For a relationship of the time interval between the SL resource and the PDCCH carrying the second DCI, refer to the specific descriptions in the foregoing example 1, FIG. 3a, or FIG. 3b. Details are not described herein again.

The foregoing describes a specific manner of determining the specified time domain position of the SL resource based on the first time interval indicated by the SL resource configuration information.

Optionally, in this embodiment of this application, the SL resource configuration information may further include time domain resource information and/or frequency domain resource information of the SL resource. For example, the time domain resource information may be further used to indicate time domain length information of the SL resource. For example, a time domain length of the SL resource is 10 slots. In other words, the terminal device may determine the time domain position and a size of the SL resource by using the first time interval and the time domain length information. For example, the terminal device determines the start time domain position of the SL resource based on the first time interval, and determines, based on the time domain length information, that the SL resource is 10 slots (slots) including the determined start time domain position.

In another implementation, in this application, specific SL resource time domain position information may be further carried by using the SL resource configuration information. For example, the SL resource configuration information may further include a frame number and a slot number of a radio frame. Correspondingly, the terminal device determines the time domain position and the size of the SL resource based on the frame number and the slot number of the radio frame.

The frequency domain resource information is used to indicate a frequency domain resource of the SL resource, for example, a quantity and an identifier of RBs (resource blocks) occupied by the SL resource. For the frequency domain resource of the SL resource, in a possible design, the SL resource allocated by the network device to the TUE and the CUE may be a time-frequency resource in bandwidth on which the terminal device camps when the terminal device transmits data on a Uu interface, and may be referred to as an in-band resource for short, for example, an uplink time-frequency resource on the Uu interface on a terminal device side. In another possible design, the SL resource allocated by the network device to the TUE and the CUE may alternatively be a time-frequency resource in bandwidth on which the terminal device camps when the terminal device transmits data on the Uu interface, and may be referred to as an out-of-band resource for short. For example, it is assumed that a frequency band of the in-band resource is 3.5 GHz to 3.6 GHz, the out-of-band resource may be a corresponding time-frequency resource in a frequency band range other than 3.5 GHz to 3.6 GHz. For example, the out-of-band resource is a time-frequency resource in a frequency band of 5.9 GHz to 6 GHz.

The foregoing is specific descriptions of determining a resource position of one SL resource by using the SL resource configuration information. To be specific, the terminal device determines, based on the SL resource configuration information, the SL resource used for one transmission. The SL resource may be an aperiodic SL resource. Optionally, in this embodiment of this application, a periodic SL resource may be further configured by using the SL resource configuration information.

Figure 4:
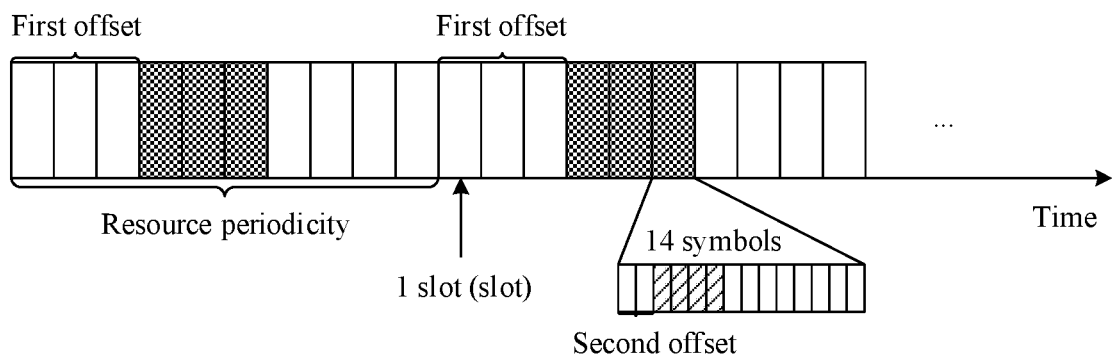
FIG. 4 is a schematic diagram of periodic resource configuration according to an embodiment of this application.

FIG. 4 is a schematic diagram of periodic SL resource configuration according to an embodiment of this application.

Specifically, for a periodic SL resource, SL resource configuration information may include one or more of the following information:

an SL resource periodicity, a time unit length of the SL resource, or a quantity of SL resource periodicities.

Optionally, the SL resource configuration information may further include one or more of the following information: a symbol position occupied by the SL resource, a symbol offset, or a quantity of valid symbols.

First, the foregoing terms are explained and described, to facilitate understanding of a person skilled in the art.

(1) The SL resource periodicity is a quantity of time units included in one periodicity. As described above, the time unit may be a radio frame, a subframe, a slot, a mini-slot, a symbol, or the like. For example, the time unit is a slot. As shown in FIG. 4, each SL resource periodicity includes 10 slots.

(2) A first time interval (e.g., the first offset in FIG. 4) is a time domain position at a first time interval away from a first specified position of a specified channel, and is also a timing offset of a first time unit occupied by an SL resource in each resource periodicity relative to a start time unit in the periodicity. For example, if the first time interval is three slots, it may indicate that a start position of a slot occupied by the SL resource is the fourth slot in the periodicity, as shown in FIG. 4.

(3) The time unit length of the SL resource is a quantity of time units that belong to the SL resource and that are included in one SL resource periodicity. For example, refer to a slot identified by a black grid shown in FIG. 4. A quantity of slots of the SL resource included in each resource periodicity is three, that is, the first slot occupied by the SL resource determined by the first offset and three consecutive slots after the first slot are included.

(4) The symbol offset (e.g., the second offset in FIG. 4) is used to indicate a position of a start symbol occupied by the SL resource, and is a position of the start symbol occupied by the SL resource in one time unit. For example, in FIG. 4, an offset between a symbol occupied by the SL resource and a start symbol of the slot is 2.

(5) The quantity of valid symbols is a quantity of symbols occupied by the SL resource in each slot that belongs to the SL resource. For example, one slot includes 14 symbols, and the quantity of valid symbols is 4. Refer to FIG. 4. The SL resource is specifically located on the third to sixth symbols of a slot in which the SL resource is located.

(6) The quantity of SL resource periodicities refers to a quantity of valid times of the SL resource periodicity. For example, if the quantity of valid times is 3, the SL resource periodicity becomes invalid after being cycled for three times.

The SL resource configuration information may be configured in the following manners. Several manners are listed below.

Configuration manner 1: The SL resource configuration information is indicated by using physical layer signaling.

The network device configures the SL resource by using the physical layer signaling. For example, the physical layer signaling may be DCI, and the DCI is the second DCI in example 3. In other words, the network device includes the SL resource configuration information in the second DCI. Correspondingly, after the terminal device receives the second DCI, the SL resource is determined based on the SL resource configuration information carried in the second DCI.

Optionally, the second DCI may be first DCI used to schedule the first data, other DCI, or DCI separately configured by the network device for carrying the SL resource configuration information. For example, the first DCI for scheduling the first data is used as an example. Before sending the first data to the TUE and the CUE, the network device sends the first DCI used for scheduling the first data to the TUE and the CUE, and the TUE and the CUE receive the first data based on a resource position indicated by the first DCI. Optionally, the first DCI may further include the SL resource configuration information, used to indicate a first time interval of the SL resource.

As described above, the first time interval is a time interval between the first specified position of the SL resource and the second indication position of another channel, for example, a time interval in any one of the foregoing examples. A specific time interval relationship may be configured by using the DCI, or may be predefined based on a protocol, or is configured by using other signaling. For example, the first time interval is configured by using RRC signaling. For example, the network device uses the RRC signaling to configure the first time interval as a time interval between the start time domain position of the SL resource and the end time domain position of the PUSCH carrying the first data. The time unit is a symbol. Then, after the network device delivers the second DCI carrying the SL resource configuration information, the terminal device may determine the start time domain position of the SL resource based on a value of the first time interval indicated by the second DCI, the end time domain position of the PUSCH carrying the first data, and the time unit indicated by the RRC signaling.

The following describes a specific manner of configuring the SL resource by using the second DCI.

In an implementation, the SL resource configuration information carried in the second DCI is a specific parameter of the SL resource.

For example, the SL resource configuration information is used to indicate the first time interval of the SL resource, and the network device includes the SL resource configuration information in an extension field of the second DCI. The extension field has at least one bit position, and a value of the extension field of the second DCI may be used to indicate a value of the first time interval. For example, the extension field has three bit positions. If bits in the three bit positions are 101 (where a value is 5), correspondingly, a value of the first time interval is 5.

The foregoing describes determining the value of the first time interval by using the SL resource configuration information. A time unit of the first time interval may be configured by the network device by using higher layer signaling, for example, as described above, configured by using the RRC signaling, or may be preset. For example, a time unit of the first time interval is preset to a slot. Correspondingly, the terminal device may determine, based on the value determined by the SL resource configuration information and the preset time unit, that the first time interval is five slots. Alternatively, a time unit of the first time interval may be configured by using the second DCI. For example, at least one bit position of the extension field of the second DCI is used to indicate a time unit. For example, a bit in a bit position at the end of the extension field is used to indicate whether the time unit is a slot or a symbol. If the bit is 1, it may indicate that the time unit is a slot. If the bit is 0, it indicates that the time unit is a symbol. For example, the extension field has four bit positions. In an order of the four bit positions from left to right, values of bits in the first three bit positions are used to indicate a value of the first time interval, and a bit in the fourth bit position is used to indicate a time unit. If bits in the four bit positions are 1011, it indicates that the first time interval is five slots.

It should be noted that the manner in which the second DCI carries the SL resource configuration information is merely an example. A manner of indicating the first time interval and the time unit, and an optional range of the time unit are not limited in this embodiment of this application.

In another implementation, a second correspondence between different index values and different SL resource configuration information is preset. The second DCI carries an index value of the SL resource configuration information, and the terminal device determines, based on the preset second correspondence, SL resource configuration information corresponding to the index value carried in the second DCI from the network device. The second correspondence preset in the TUE and the CUE may be defined based on a protocol, or may be configured by the network device, or may be notified to the TUE and the CUE by a device other than the network device, for example, another terminal device.

In a specific example, the second correspondence may be shown in the following Table 1.

TABLE 1

| Index value | SL resource configuration information |
|---|---|
| 0 | The first time interval is one slot |
| 1 | The first time interval is two slots |
| 2 | The first time interval is three slots |
| 3 | The first time interval is four slots |
| 4 | The first time interval is one symbol |
| 5 | The first time interval is two symbols |
| . . . | . . . |

Optionally, the SL resource configuration information in the foregoing correspondence may further include time domain resource information and/or frequency domain resource information of the SL resource. Details are not described herein again. If the SL resource configuration information does not include the time domain resource information and/or the frequency domain resource information of the SL resource, the network device may perform configuration for the TUE and the CUE by using other signaling. For example, the SL resource configuration information indicated by the second DCI includes the first time interval and the time domain resource information, and then, the network device may further configure a frequency domain resource of the SL resource for the TUE and the CUE by using RRC signaling.

It should be noted that the foregoing is merely an example. A manner of carrying the SL resource configuration information by using the second DCI is not limited in this embodiment of this application. For example, the SL resource configuration information may be carried in an extension field of the second DCI, or may be carried in an existing field of the second DCI. It should be understood that DCI with different functions has different formats and fields. For example, DCI used to indicate a PUSCH has an MCS index value, and the MCS index value is used to indicate a modulation order and a code rate of the PUSCH. In this embodiment of this application, the network device may indicate the index value of the SL resource configuration information by using the MCS index value of the DCI. When the index value of the SL resource configuration information is indicated by using the existing field in the second DCI, the terminal device may be triggered, by using additional signaling, to perform new interpretation on the existing field in the DCI. In other words, not only the modulation order and the code rate of the PUSCH are determined based on the existing field, for example, the MCS index value, but also the SL resource configuration information may be matched from the preset second correspondence based on the MCS index value.

Based on configuration manner 1, the network device can dynamically configure the SL resource by using the DCI. The configuration manner is more flexible, and can better adapt to a channel change.

Configuration manner 2: The network device indicates the SL resource configuration information by using higher layer signaling.

For example, the higher layer signaling may be RRC signaling, and the network device includes the SL resource configuration information in the RRC signaling. Correspondingly, after receiving the RRC signaling, the terminal device determines the SL resource based on the SL resource configuration information carried in the RRC signaling. A manner of configuring the SL resource by using the RRC signaling is similar to a manner of configuring the SL resource by using the DCI. For details, refer to the descriptions of configuration manner 1. Details are not described herein again.

Because update time of the RRC signaling is long, when the SL resource is configured by using the RRC signaling, the SL resource may be configured as a periodic SL resource. Table 2 shows a specific example of a second correspondence for configuring a periodic SL resource according to an embodiment of this application.

TABLE 2

| Index value | SL resource configuration information |
|---|---|
| 0 | The first time interval is one slot, the SL resource periodicity is five slots, the time length of the SL resource is two slots, the quantity of SL resource periodicities is 10; |
| 1 | The first time interval is two slots, SL resource periodicity is 10 slots, the time length of the SL resource is three slots, the quantity of SL resource periodicities is 10; |
| 2 | The first time interval is three symbols, the SL resource periodicity is 15 slots, the time length of the SL resource is five slots, the quantity' of SL resource periodicities is 3; |
| . . . | . . . |

The network device includes, in the RRC signaling, the index value of the SL resource configuration information, and the TUE and the CUE determine the SL resource based on the index value of the SL resource configuration information carried in the RRC signaling. Before the RRC signaling is updated, the TUE and the CUE may transmit first feedback information based on an SL resource indicated by previous RRC signaling.

Based on the foregoing configuration manner, the network device may implement semi-static configuration of the SL resource by using the RRC signaling. Before the RRC signaling is updated, the TUE and the CUE may transmit the first feedback information based on the SL resource indicated by the previous RRC signaling, to reduce resource overheads and shorten a delay.

Configuration manner 3: The SL resource configuration information is predefined based on a protocol.

The CUE and the TUE determine, based on the SL resource configuration information predetermined in a protocol, an SL resource used to feed back a receiving result.

The SL resource predefined based on a protocol may be a periodic SL resource, or may be an aperiodic SL resource.

Based on the foregoing configuration manner, the SL resource can be statically configured, and the TUE and the CUE transmit the first feedback information based on the SL resource predefined by a protocol, to reduce signaling overheads on a network device side.

The foregoing is specific descriptions of configuring the SL resource in this embodiment of this application. The TUE and the CUE separately determine the SL resource in the foregoing configuration manner. Subsequently, after receiving the first data, the TUE sends, to the CUE by using the determined SL resource, first feedback information used to indicate a receiving result of the TUE for the first data. Correspondingly, the CUE receives the first feedback information by using a same SL resource. Then, the CUE needs to send, to the network device by using an uplink time-frequency resource allocated by the network device, second feedback information used to indicate receiving results of the TUE and the CUE separately for the first data.

The following describes, by using content of part 2, a process in which the network device allocates the uplink time-frequency resource to the CUE.

[Part 2]

The network device configures, for the CUE, an uplink time-frequency resource used to transmit the second feedback information. A configuration manner may be configured by using physical layer signaling (e.g., DCI), or may be configured by using higher layer signaling (e.g., RRC signaling), or may be predefined in a protocol. For details, refer to descriptions of the SL resource configuration manner. Details are not described herein again.

Similarly, application of the uplink time-frequency resource configured for the CUE in this application is similar to application of the SL resource. The uplink resource configuration information indicates a second time interval of the uplink resource. To distinguish the second time interval from the specified position corresponding to the first time interval, the second time interval may be a time interval between a third specified position of the uplink time-frequency resource and a fourth specified position of another channel. Similarly, the third specified position and the fourth specified position may be a same relative position relative to different resources, or may be different relative positions. The uplink resource may alternatively be a periodic uplink time-frequency resource, or may be an aperiodic uplink time-frequency resource. Specifically, for a configuration manner of the uplink resource, refer to descriptions of the SL resource configuration manner. Details are not described herein again. It is similar to the first time interval that, a unit of the second time interval may be a radio frame, a subframe, a slot, a mini-slot, a symbol, or the like. The time unit of the second time interval is not limited in this application.

The following describes a relationship between the uplink time-frequency resource and the second time interval with reference to specific examples.

Example 1: The second time interval is a time interval between the third specified position of the uplink resource and the fourth specified position of the channel carrying the first data.

Figure 5A:
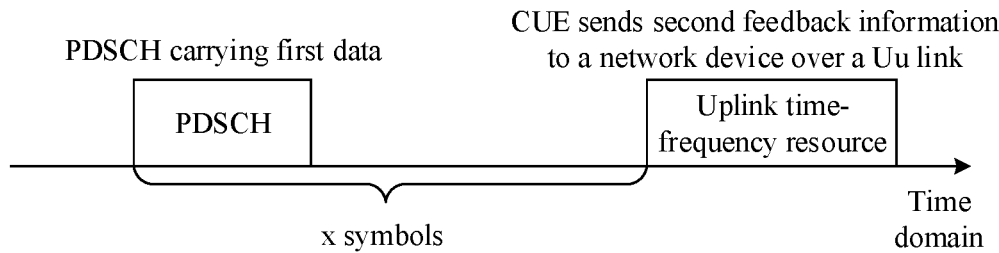
FIG. 5a and FIG. 5b each are a schematic diagram of a scenario of determining an uplink time-frequency resource according to an embodiment of this application.
Figure 5B:
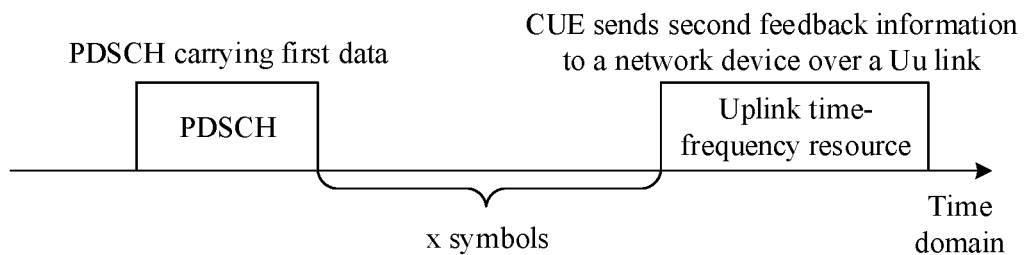

FIG. 5a and FIG. 5b each are a specific example reflecting a second time interval according to an embodiment of this application. It is assumed that in scenarios in FIG. 5a and FIG. 5b, the second time interval is x symbols, and the first data is carried on a PUSCH.

In the scenario shown in FIG. 5a, the second time interval of the uplink time-frequency resource is a time interval between a start time domain position of the PUSCH carrying the first data and a start time domain position of the uplink time-frequency resource. In other words, a time deviation between the start time domain position of the PUSCH carrying the first data and the start time domain position of the uplink time-frequency resource is x symbols. Correspondingly, after receiving the uplink resource configuration information, the CUE determines the start time domain position of the uplink time-frequency resource based on the second time interval indicated by the uplink resource configuration information and the start time domain position of the received PUSCH carrying the first data.

In the scenario shown in FIG. 5a, the second time interval of the uplink time-frequency resource is a time interval between an end time domain position of the PUSCH carrying the first data and a start time domain position of the uplink time-frequency resource. In other words, a time deviation between the end time domain position of the PUSCH carrying the first data and the start time domain position of the uplink time-frequency resource is x symbols. Correspondingly, after receiving the uplink resource configuration information, the CUE determines the start time domain position of the uplink time-frequency resource based on the second time interval indicated by the uplink resource configuration information and the end time domain position of the received PUSCH carrying the first data.

Example 2: The second time interval is a time interval between the uplink time-frequency resource and a channel carrying control information used to schedule the first data.

Similarly, the second time interval may be a time interval between the third specified position of the uplink time-frequency resource and the fourth specified position of the channel carrying the control information. For example, the control information used to schedule the first data is first DCI, and the first DCI is carried on the PDCCH. For example, the second time interval may be a time interval between the start time domain position of the uplink time-frequency resource and a start time domain position of the PDCCH carrying the first DCI. For another example, the time interval may alternatively be a time interval between the start time domain position of the time-frequency resource and an end time domain position of the PDCCH carrying the first DCI. For a relationship between the uplink time-frequency resource and the time interval of the PDCCH carrying the first DCI, refer to the specific descriptions of example 1, FIG. 5a, or FIG. 5b in part 2. Details are not described herein again.

Example 3: The second time interval is a time interval between the uplink time-frequency resource and a channel carrying uplink time-frequency resource configuration information.

For example, the network device includes the uplink resource configuration information in physical layer signaling. For example, the network device configures the uplink time-frequency resource by using third DCI, and the third DCI is carried on a PDCCH. Alternatively, the second time interval may be a time interval between a third specified position of the uplink time-frequency resource and a fourth specified position of a PDCCH carrying the third DCI.

It should be noted that some or all of the first DCI used to schedule the first data, the second DCI used to configure the SL resource, and the third DCI used to configure the uplink time-frequency resource may be same DCI, or may be different DCI. For example, the third DCI is DCI different from the second DCI and the first DCI. For another example, the second DCI and the third DCI are same DCI, to be specific, the network device configures both the SL resource and the uplink time-frequency resource by using the same DCI. For another example, the first DCI and the third DCI may be same DCI, to be specific, the network device schedules the first data and configures the uplink time-frequency resource by using the same DCI. This is not limited in this embodiment of this application.

Example 5: The second time interval may alternatively be a time interval between the third specified position of the uplink time-frequency resource and the fourth specified position of the SL resource carrying the first feedback information.

Figure 6A:
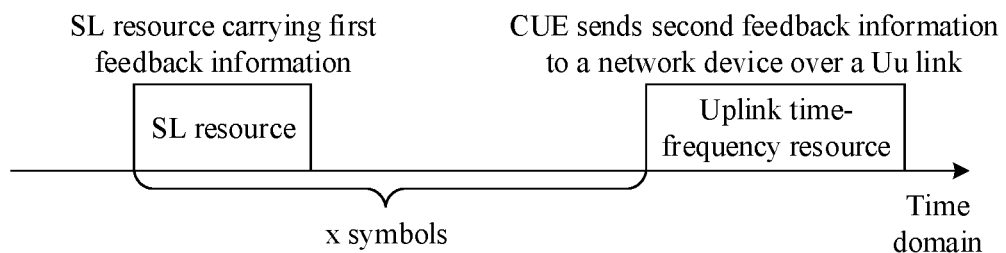
FIG. 6a and FIG. 6b each are a schematic diagram of another scenario of determining an uplink time-frequency resource according to an embodiment of this application.
Figure 6B:
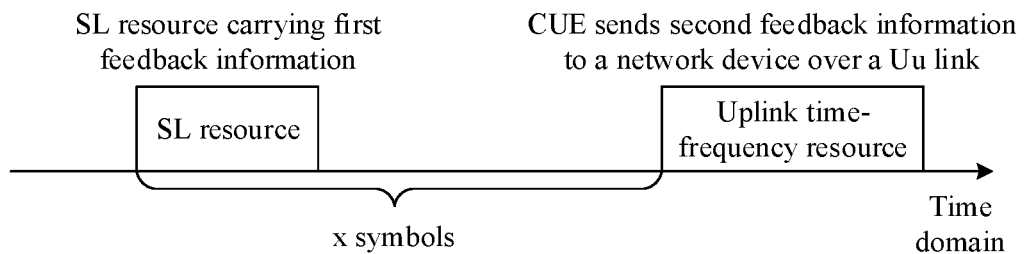

Specifically, refer to FIG. 6a and FIG. 6b. In a scenario shown in FIG. 6a, the second time interval is a time interval between a start time domain position of the uplink time-frequency resource and a start time domain position of the SL resource carrying the first feedback information. It is assumed that the time interval is x symbols. In other words, a time deviation between the start time domain position of the SL resource carrying the first feedback information and the start time domain position of the uplink time-frequency resource is x symbols.

In the scenario shown in FIG. 6b, the second time interval is a time interval between the start time domain position of the uplink time-frequency resource and an end time domain position of the SL resource carrying the first feedback information. It is assumed that the time interval is x symbols. In other words, a time deviation between the end time domain position of the SL resource carrying the first feedback information and the start time domain position of the uplink time-frequency resource is x symbols.

The foregoing is specific descriptions of configuring the uplink time-frequency resource in this embodiment of this application. The CUE determines the uplink time-frequency resource in the foregoing manner. Subsequently, after receiving the first feedback information of the TUE, the CUE determines a receiving result of the TUE based on the first feedback information, determines second feedback information based on the receiving result of the CUE and the receiving result of the TUE, and sends the second feedback information to the network device by using the determined uplink time-frequency resource.

The following describes, by using content of part 3, a specific manner of determining, by the CUE, the second feedback information based on the receiving result of the CUE and the receiving result of the TUE.

[Part 3]

The CUE receives the first feedback information from the TUE, where the first feedback information is used to indicate a receiving result of the TUE for the first data. The CUE determines the second feedback information based on a receiving result of the CUE for the first data and the receiving result of the TUE for the first data. In other words, the second feedback information is used to indicate, to the network device, the receiving result of the TUE for the first data and the receiving result of the CUE for the first data.

In this embodiment of this application, the second feedback information may have at least two bit positions, and bit values of the two bit positions are used to indicate a receiving result of the TUE and a receiving result of the CUE. There are a plurality of specific indication manners, and two manners are listed below.

Indication manner 1: Indication is performed in a joint coding manner.

The second feedback information may include at least two bit positions, where a bit in at least one bit position in the at least two bit positions is used to indicate the receiving result of the TUE for the first data, and a bit in at least one bit position in the remaining bit position is used to indicate the receiving result of the CUE for the first data. For example, it is assumed that the second feedback information has two bit positions. In descending order, a first bit position in the two bit positions is used to indicate the receiving result of the TUE, and a second bit in the two bit positions is used to indicate the receiving result of the CUE. In addition, it is defined that when the bit value is 1, it indicates that the receiving result is successful receiving, or when the bit value is 0, it indicates that the receiving result is unsuccessful receiving.

For example, if the receiving results of the TUE and the CUE for the first data are successful receiving, the second feedback information is 11.

If the receiving results of the TUE and the CUE for the first data are unsuccessful receiving, the second feedback information is 00.

If the receiving result of the TUE for the first data is unsuccessful receiving, and the receiving result of the CUE for the first data is successful receiving, the second feedback information is 01.

It should be understood that the foregoing is merely an example. A sequence of the bit positions used to indicate the receiving result of the CUE and the bit positions used to indicate the receiving result of the TUE is not limited in this application, but the network device reads the second feedback information according to a same rule as that of the terminal device. For example, if it is defined that the first bit position of the second feedback information is used to indicate the receiving result of the CUE, and the second bit position is used to indicate the receiving result of the TUE, if the receiving result of the TUE for the first data is unsuccessful receiving, and the receiving result of the CUE for the first data is successful receiving, the second feedback information may be 10.

Indication manner 2: Indication is performed by using an index corresponding to a combination of the receiving result of the CUE and the receiving result of the TUE.

In an implementation, a first correspondence between each index and each combination of different possible receiving results of the CUE and different possible receiving results of the TUE is preset, and the second feedback information carries an index value corresponding to the receiving result of the CUE and the receiving result of the TUE.

Specifically, the second feedback information has at least two bit positions, and a bit value of the two bit positions is an index value corresponding to the combination of the receiving result of the CUE and the receiving result of the TUE.

For example, there may be three states of the combination of the receiving result of the CUE and the receiving result of the TUE, which are respectively as follows:

(1) State 1: The receiving result of the TUE is successful receiving.

It should be understood that when the receiving result of the TUE is successful receiving, regardless of whether the CUE successfully receives the first data, the TUE does not need to re-receive the first data. In other words, the network device does not need to resend the first data to the TUE, and the CUE does not need to send the first data to the TUE either.

(2) State 2: The receiving result of the TUE is unsuccessful receiving, and the receiving result of the CUE is successful receiving.

(3) State 3: The receiving results of both the TUE and the CUE are unsuccessful receiving.

In a specific example, the first correspondence may be shown in the following Table 3.

TABLE 3

| Index value | Combination state of the receiving results of the TUE and the CUE |
|---|---|
| 00 | The receiving result of the TUE is successful receiving |
| 01 | The receiving result of the TUE is unsuccessful receiving, and the receiving result of the CUE is successful receiving |
| 10 | The receiving results of both the TUE and the CUE are unsuccessful receiving |

It should be noted that Table 3 is merely an example. An index value corresponding to a combination state of the receiving results of the TUE and the CUE is not limited in this application. For example, an index value of the third state of the combination state of the receiving results of the TUE and the CUE may be 00, an index value of the second state is 10, an index value of the first state is 01, and any index value that can indicate a combination state of different receiving results of the TUE and the CUE is applicable to this embodiment of this application.

For example, based on the first correspondence shown in Table 3, if both the receiving results of the CUE and the receiving results of the TUE are unsuccessful receiving, the CUE determines that the second feedback information is 10. If both the receiving results of the CUE and the receiving results of the TUE are successful receiving, the CUE determines that the second feedback information is 00. If the receiving result of the TUE is successful receiving, and the receiving result of the CUE is unsuccessful receiving, the CUE determines that the second feedback information is also 00. If the receiving result of the TUE is unsuccessful receiving, and the receiving result of the CUE is successful receiving, the CUE determines that the second feedback information is 01.

The CUE sends the determined second feedback information to the network device by using the configured uplink time-frequency resource. Correspondingly, the network device receives the second feedback information from the CUE, and performs a corresponding operation based on the second feedback information.

The following describes a corresponding operation performed by the network device based on the second feedback information.

If the second feedback information indicates that the TUE successfully receives the first data, the network device determines that the TUE does not need to re-receive the first data. As described above, the network device does not need to resend the first data to the TUE, and the CUE does not need to send the first data to the TUE either. Specifically, in this embodiment of this application, if the TUE does not successfully receive the first data, the network device may allocate, to the CUE, the SL resource used to forward the first data to the TUE. If the network device preconfigures the SL resource used to forward the first data for the CUE, when the network device determines that the CUE does not need to send the first data to the TUE, because the CUE does not need to forward the first data, a behavior of the CUE is that the CUE releases the SL resource used to forward the first data.

If the second feedback information indicates that neither the TUE nor the CUE successfully receives the first data, the network device re-sends the first data on the Uu. Similarly, if the network device preconfigures the SL resource used to forward the first data for the CUE, and the network device determines that the CUE does not need to send the first data to the TUE, a behavior of the CUE is that the CUE releases the SL resource used to forward the first data.

If the second feedback information indicates that the TUE does not successfully receive the first data but the CUE successfully receives the first data, the network device may indicate the CUE to send the first data to the TUE.

Specifically, a procedure of indicating the CUE to send the first data may be as follows: The network device sends first indication information to the CUE and the TUE, to indicate the CUE to send the first data to the TUE by using an SL resource used to forward the first data. The first indication information may be carried in physical layer signaling, or the first indication information is carried in RRC signaling, or the first indication information is carried in service data. Correspondingly, after receiving the first indication information from the network device, the CUE sends the first data to the TUE by using the SL resource that is used to forward the first data and that is configured by the network device. Correspondingly, after receiving the first indication information, the TUE receives the first data from the CUE by using the same SL resource that is used to forward the first data and that is configured by the network device.

Optionally, the SL resource used to forward the first data may be the foregoing configured periodic SL resource used to transmit the first feedback information, or may be an SL resource that is reconfigured by the network device for the CUE and the TUE and that is used to forward the first data. For example, the network device includes, in the first indication information, the configuration information of the SL resource used to indicate the CUE to send the first data, and the configuration information may indicate that the SL resource used to forward the first data is a time-frequency resource at an interval of 10 symbols from the start position of the channel carrying the first indication information. For a specific configuration manner, refer to the foregoing descriptions of configuring the SL resource used to transmit the first feedback information. Details are not described herein again.

Figure 7A:
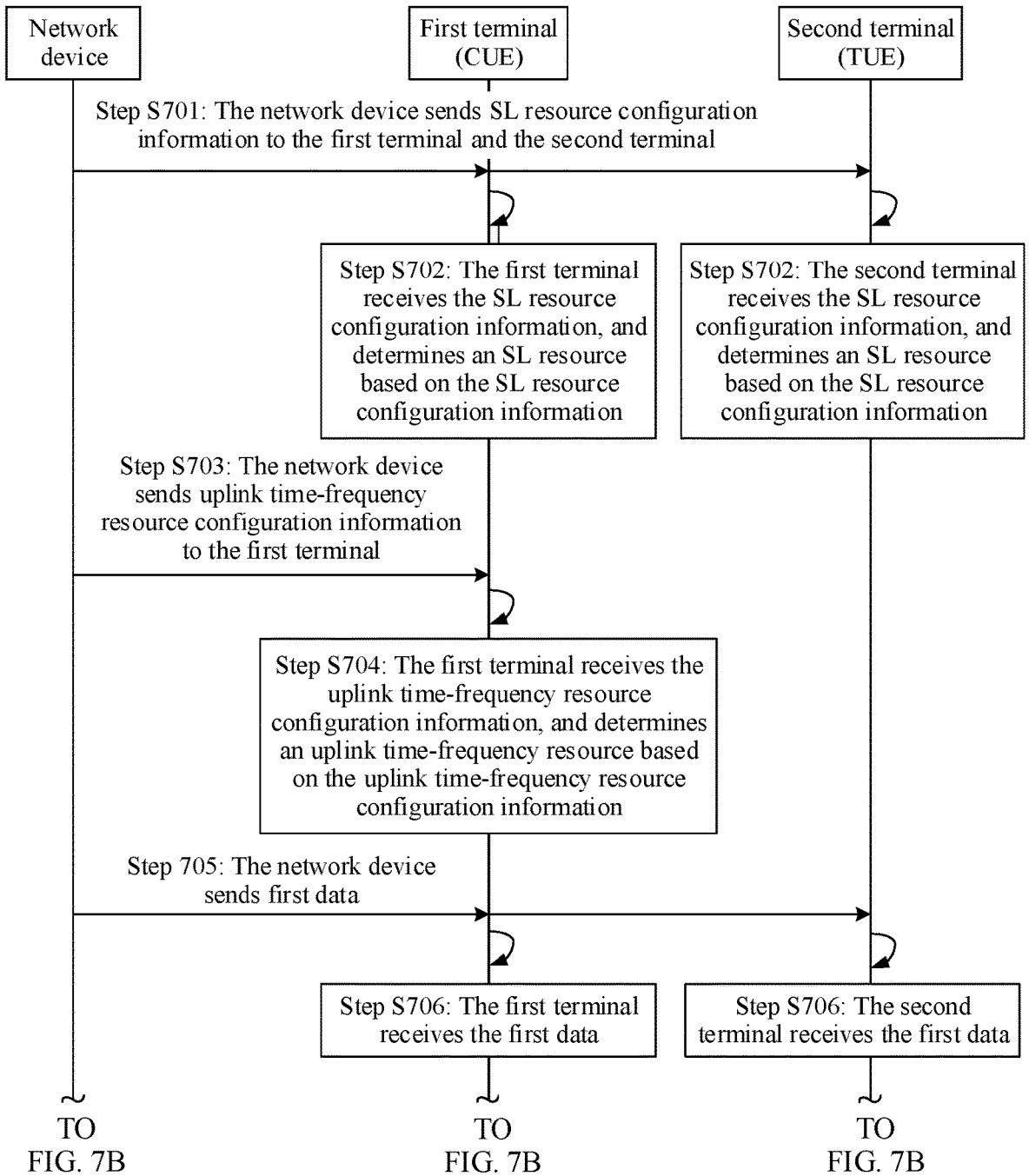
FIG. 7A and FIG. 7B are a complete schematic flowchart of a data feedback method according to an embodiment of this application.
Figure 7B:
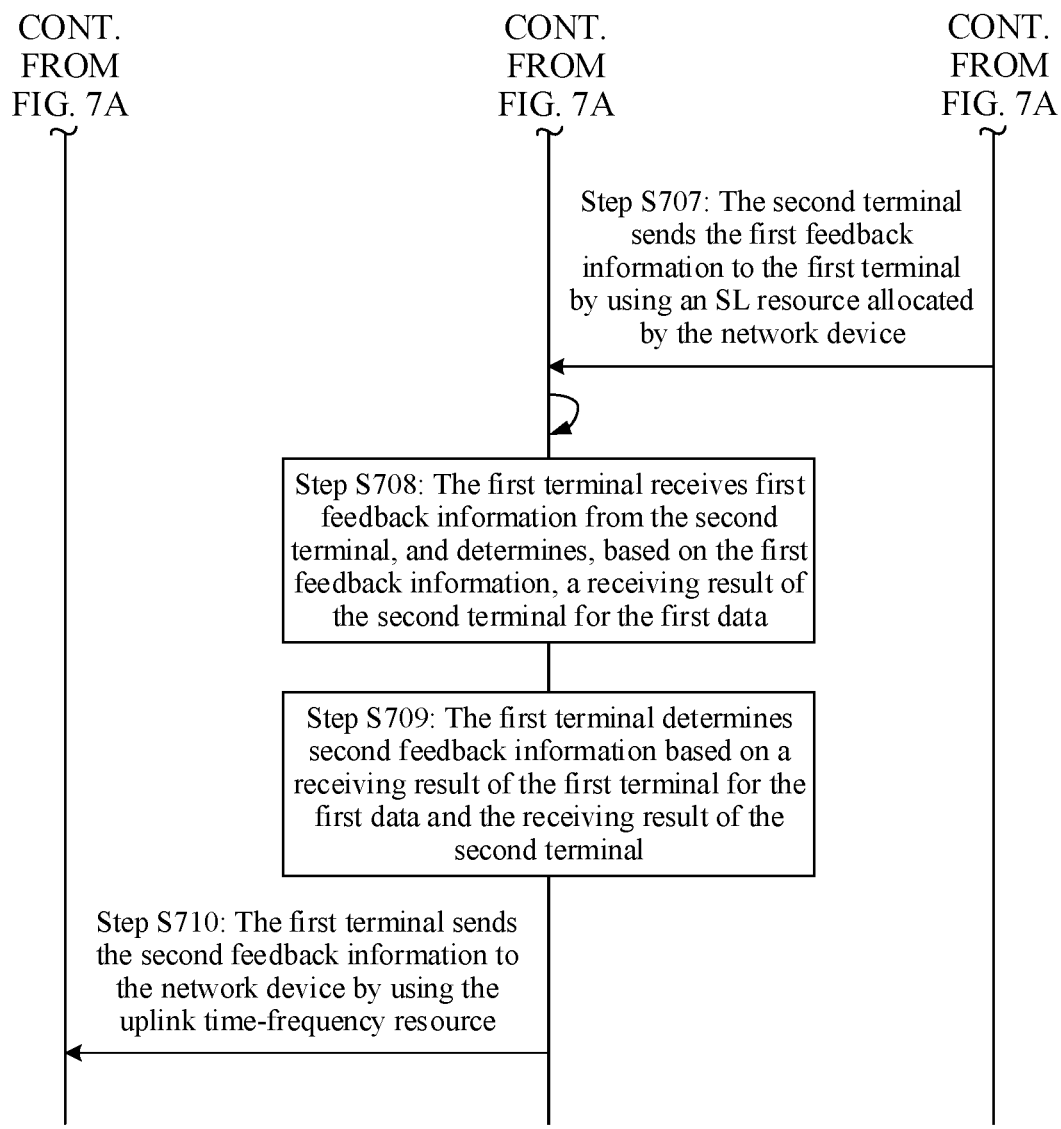

FIG. 7A and FIG. 7B are a complete schematic flowchart of a data feedback method according to an embodiment of this application. The method includes the following step S701 to step S708.

Step S701: A network device sends SL resource configuration information to a first terminal and a second terminal.

As described above, the first terminal is CUE, and the second terminal is TUE.

Specifically, the network device sends, to the first terminal and the second terminal, configuration information of an SL resource allocated to the first terminal and the second terminal.

It should be noted that step S701 is merely an example. As described above, the SL resource may alternatively be predefined in a protocol, or may be configured by another device for the first terminal and the second terminal, or may be known before the first terminal and the second terminal perform a current procedure of receiving the first data, and a manner of configuring the SL resource is not limited in this application.

Step S702: The first terminal and the second terminal separately receive the SL resource configuration information, and determine a resource position of the SL resource based on the SL resource configuration information.

Step S701 and step S702 are optional steps, and are not mandatory steps. For example, the first terminal and the second terminal may determine the SL resource based on a definition of the SL resource in a protocol, and therefore step S701 and step S702 do not need to be performed.

Step S703: The network device sends uplink time-frequency resource configuration information to the first terminal.

It should be noted that step S701 is merely an example. As described above, an uplink time-frequency resource may be predefined in a protocol, or may be configured by another device for the first terminal, or may be known by the first terminal before the first terminal performs a current procedure of receiving the first data, and a manner of configuring the uplink time-frequency resource is not limited in this application.

It should be noted that step 701 and step 703 are merely a specific example provided in this application. A sequence of sending the SL resource configuration information and the uplink time-frequency resource configuration information by the network device is not limited in this application. The SL resource configuration information and the uplink time-frequency resource configuration information may be sent sequentially or simultaneously. For example, the network device may first send the uplink time-frequency resource configuration information to the first terminal, and then send the SL resource configuration information. For another example, the network device may first send the uplink time-frequency resource configuration information and the SL resource configuration information to the first terminal, and then send the SL resource configuration information to the second terminal. For another example, the network device sends both the uplink time-frequency resource configuration information and the SL resource configuration information to the second terminal.

Step S704: The first terminal receives the uplink time-frequency resource configuration information.

Step S703 and step S704 are optional steps, and are not mandatory steps. For example, the first terminal may determine the uplink time-frequency resource based on a definition of the uplink time-frequency resource in a protocol, and does not need to perform step S703 and step S704.

Step S705: The network device sends the first data to the first terminal and the second terminal.

It should be noted that a solution including step S701 to step S705 is merely a specific example. A sequence of sending the first data, the SL resource, and the uplink time-frequency resource by the network device is not limited in this application. The first data, the SL resource, and the uplink time-frequency resource may be sent sequentially or simultaneously, or some are sent simultaneously and some are sent sequentially. For example, the network device may first send the first data, and then sequentially send the SL resource configuration information and the uplink time-frequency resource configuration information; or sequentially send the uplink time-frequency resource configuration information and the SL resource configuration information, and then send the first data. Alternatively, the network device simultaneously sends the SL resource configuration information and the uplink time-frequency resource information, and then sends the first data. Alternatively, the network device simultaneously sends the first data, the SL resource configuration information, and the uplink time-frequency resource configuration information.

Step S706: The first terminal and the second terminal separately receive the first data, and decode the received first data, to determine receiving results of the first terminal and the second terminal for the first data.

Step S707: The second terminal sends first feedback information to the first terminal by using the SL resource allocated by the network device.

Step S708: The first terminal receives the first feedback information from the second terminal by using the SL resource.

Step S709: The first terminal determines second feedback information based on the receiving result of the first terminal for the first data and the received first feedback information.

Step S710: The first terminal sends the second feedback information to the network device by using the uplink time-frequency resource.

Figure 8A:
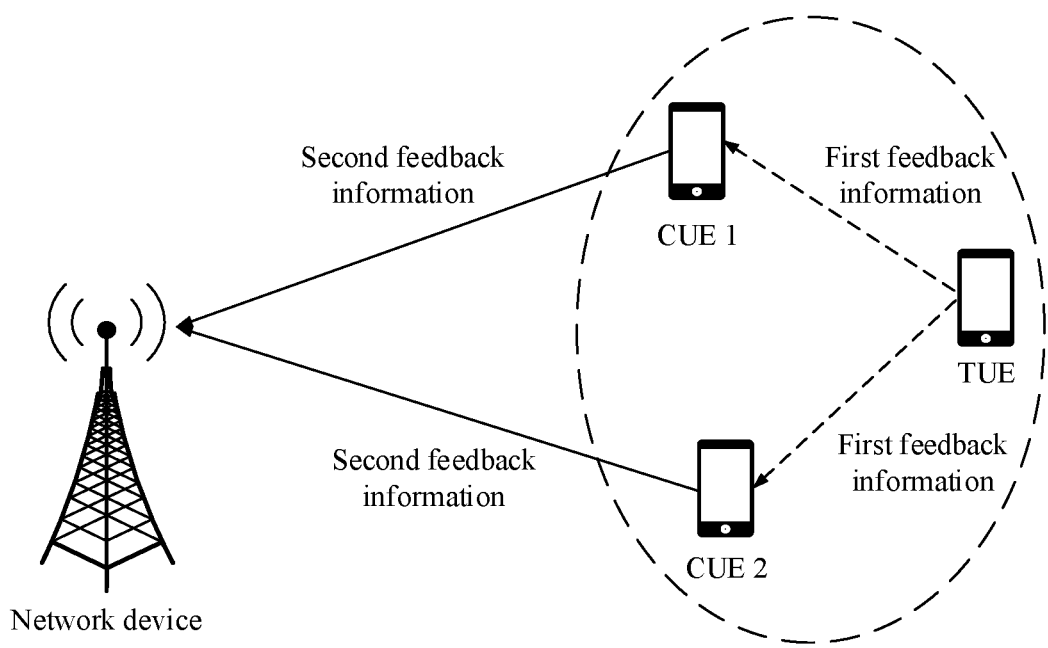
FIG. 8a and FIG. 8b each are a schematic diagram of a data feedback application scenario according to an embodiment of this application.

The foregoing describes the technical solution of this application by using an interaction procedure between one TUE and one CUE of the TUE. This application is also applicable to a scenario in which the TUE has a plurality of CUEs. In this scenario, in an implementation, as shown in FIG. 8a, the plurality of CUEs perform same operations. For example, the plurality of CUEs may separately perform the operations performed by the second terminal as an execution body in FIG. 8a. Specifically, the TUE separately sends the first feedback information to the plurality of CUEs. The plurality of CUEs separately determine the second feedback information based on receiving results of the plurality of CUEs for the first data and a receiving result that is of the TUE and that is determined by using the first feedback information, and separately send the second feedback information to the network device. For example, in FIG. 8a, the TUE has three CUEs, and the network device receives second feedback information separately sent by the three CUEs.

Figure 8B:
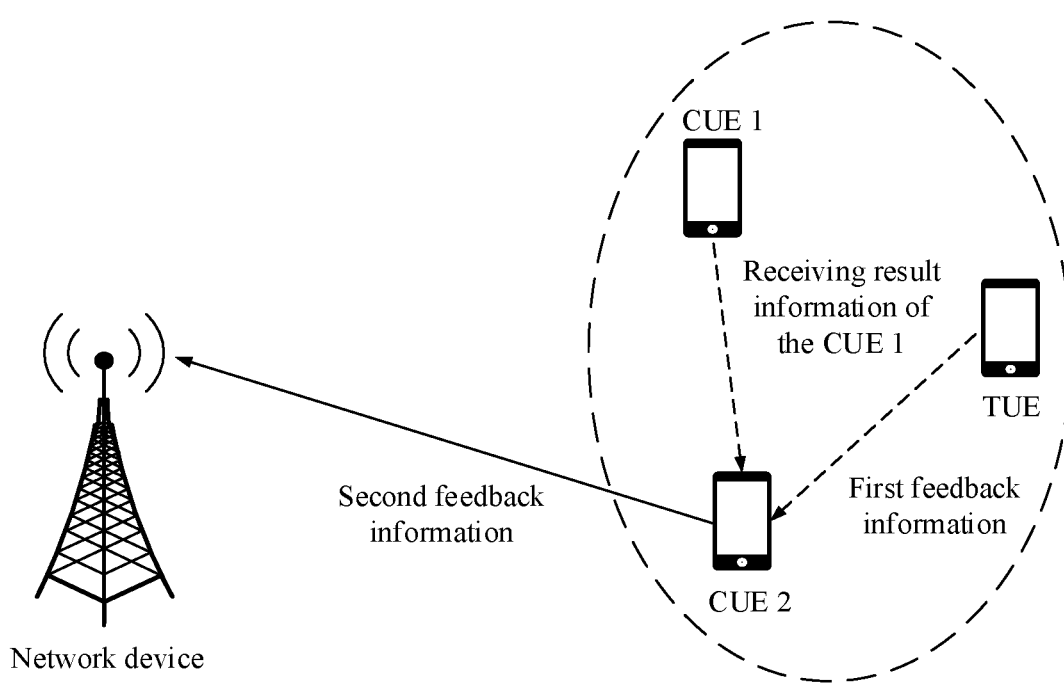

In another implementation, in a communication system shown in FIG. 8b, the communication system may include at least one first CUE, and remaining CUE sends, to the first CUE, information about a receiving result of the remaining CUE for the first data, the first CUE determines the second feedback information based on the receiving result of the first CUE, the receiving result of the another CUE, and the receiving result of the TUE. For example, when an indication manner of the second feedback information is joint encoding, at least one bit position may be used to represent the receiving result of each CUE, the second feedback information carries a device identifier of the CUE or carries a device identifier of the successfully received CUE, to indicate the terminal device successfully received by the network device. Specifically, for a configuration manner of the second feedback information, refer to specific descriptions of the foregoing related indication manners. Details are not described herein again. Then, the first CUE sends the determined second feedback information to the network device.

Based on the foregoing design, the TUE sends the first feedback information to the CUE based on a sidelink, and the CUE based on the first feedback information determines a receiving result of the TUE, determines second feedback information based on the receiving result of the CUE and the receiving result of the TUE, and sends the second feedback information to the network device. In this way, while meeting an energy saving requirement of the terminal device, the network device can also determine a receiving result of the TUE based on the second feedback information, and can perform a corresponding operation based on the receiving results of the TUE and the CUE. In terms of a volume of an electronic device having an energy saving requirement, the technical solution of this application can effectively reduce resource waste caused when the network device repeatedly sends the first data when the network device cannot determine the receiving result of the TUE.

Figure 9:
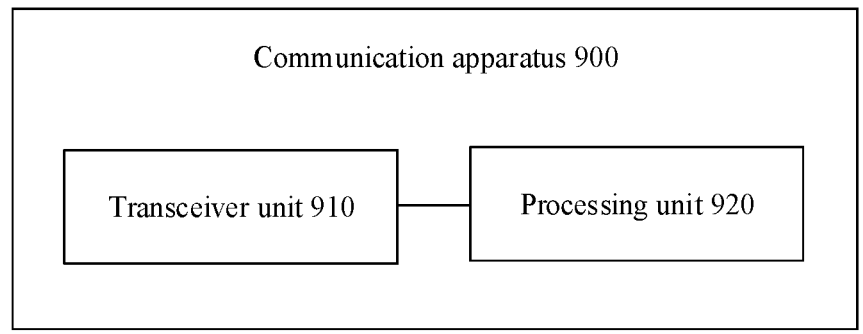
FIG. 9 is a schematic diagram of a structure of a communication apparatus according to an embodiment of this application.

An embodiment of this application provides a communication apparatus. FIG. 9 is a schematic diagram of a structure of a communication apparatus according to an embodiment of this application. The communication apparatus 900 includes a transceiver unit 910 and a processing unit 920. The communication apparatus may be configured to implement functions of the first terminal or the second terminal in any one of the foregoing method embodiments. For example, the communication apparatus may be a terminal device, for example, a handheld terminal device or a vehicle-mounted terminal device. The communication apparatus may be a chip included in the terminal device or an apparatus including the terminal device, for example, various types of vehicles. The communication apparatus may alternatively be another combined device, a component, or the like that has the function of the foregoing terminal device. When the communication apparatus is the terminal device, the transceiver unit may be a transceiver, and may include an antenna, a radio frequency circuit, and the like, and the processing unit may be a processor, for example, a central processing unit (CPU). When the communication apparatus is the component having the function of the foregoing terminal device, the transceiver unit may be a radio frequency unit, and the processing unit may be a processor. When the communication apparatus is a chip system, the transceiver unit may be an input/output interface of the chip system, and the processing unit may be a processor of the chip system.

When the communication apparatus is used as the first terminal to perform the method embodiment shown in FIG. 2, the transceiver unit 910 is configured to: receive first data from the network device, receive first feedback information from the second terminal, and send second feedback information to the network device. The processing unit 920 is configured to perform an operation of determining the second feedback information based on the first feedback information and a receiving result of the second terminal for the first data. The processing unit 920 in the communication apparatus may be implemented by a processor or a processor-related circuit component, and the transceiver unit 910 may be implemented by a transceiver or a transceiver-related circuit component. Operations and/or functions of the modules in the communication apparatus are respectively used to implement corresponding procedures of the methods shown in FIG. 2, or FIG. 7A and FIG. 7B. For example, in FIG. 2, if the communication apparatus is the first terminal, the transceiver unit 910 may be configured to perform step S202, step S204, and step S206, and the processing unit 920 may be configured to perform step S205. For example, in FIG. 7A, if the communication apparatus is the second terminal, the transceiver unit 910 may be configured to perform step S702 and step S704. For brevity, examples are not enumerated one by one herein.

When the communication apparatus is used as the second terminal to perform the method embodiment shown in FIG. 2, the transceiver unit 910 is configured to perform operations of receiving the first data from the network device and sending the first feedback information to the first terminal. The processing unit 920 is configured to determine the SL resource based on the received SL resource configuration information.

The processing unit 920 in the communication apparatus may be implemented by a processor or a processor-related circuit component, and the transceiver unit 910 may be implemented by a transceiver or a transceiver-related circuit component. Operations and/or functions of the modules in the communication apparatus are respectively used to implement corresponding procedures of the methods shown in FIG. 2, or FIG. 7A and FIG. 7B. For example, in FIG. 2, if the communication apparatus is the second terminal, the transceiver unit 910 may be configured to perform step S202 and step S203. For example, in FIG. 7A, if the communication apparatus is the second terminal, the transceiver unit 910 may be configured to perform step S701, and the processing unit 920 may be configured to perform step S702. For brevity, examples are not enumerated one by one herein.

Figure 10:
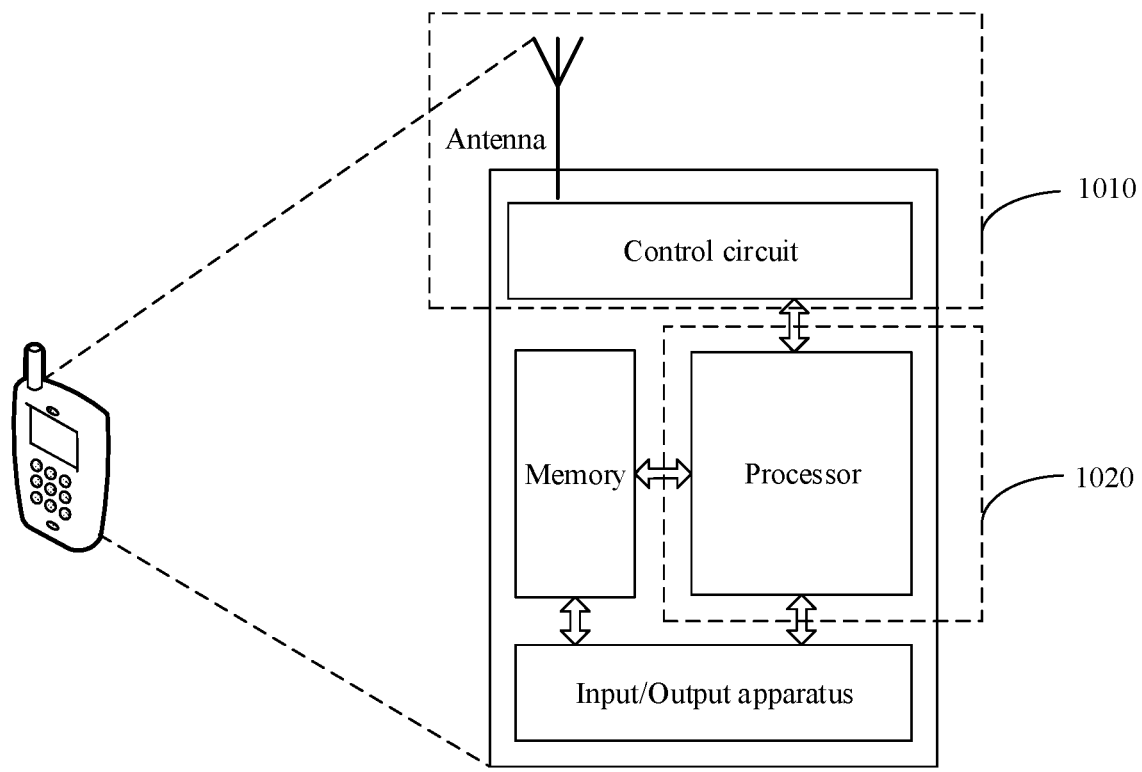
FIG. 10 is a schematic diagram of another structure of a communication apparatus according to an embodiment of this application.

FIG. 10 is a schematic diagram of another structure of a communication apparatus according to an embodiment of this application. The communication apparatus may be specifically a terminal device. For ease of understanding and ease of illustration, in FIG. 10, a mobile phone is used as an example of the terminal device. As shown in FIG. 10, the terminal device includes a processor, a memory, a radio frequency circuit, an antenna, an input/output apparatus, and the like. The processor is mainly configured to: process a communication protocol and communication data, control the terminal device, execute a software program, process data of the software program, and the like. The memory is configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to: receive data input by a user and output data to the user. It should be noted that some types of terminal devices may have no input/output apparatus.

When data needs to be sent, the processor performs baseband processing on the to-be-sent data, and outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data and processes the data. For ease of description, FIG. 10 shows only one memory and one processor. An actual terminal device product may include one or more processors and one or more memories. The memory may also be referred to as a storage medium, a storage device, or the like. The memory may be independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 10, the terminal device includes the transceiver unit 1010 and the processing unit 1020. The transceiver unit may also be referred to as a transceiver, a transceiver machine, a transceiver apparatus, or the like. The processing unit may also be referred to as a processor, a processing board, a processing unit, a processing apparatus, or the like. Optionally, a component configured to implement a receiving function in the transceiver unit 1010 may be considered as a receiving unit, and a component configured to implement a sending function in the transceiver unit 1010 may be considered as a sending unit. In other words, the transceiver unit 1010 includes the receiving unit and the sending unit. The transceiver unit may sometimes be referred to as a transceiver, a transceiver, a transceiver circuit, or the like. The receiving unit sometimes may also be referred to as a receiver machine, a receiver, a receiver circuit, or the like. The sending unit may also be sometimes referred to as a transmitter, a transmitter, a transmitting circuit, or the like. It should be understood that the transceiver unit 1010 is configured to perform a sending operation and a receiving operation on a terminal device side in the foregoing method embodiments, and the processing unit 1020 is configured to perform another operation other than the receiving operation and the sending operation of the terminal device in the foregoing method embodiments.

Figure 11:
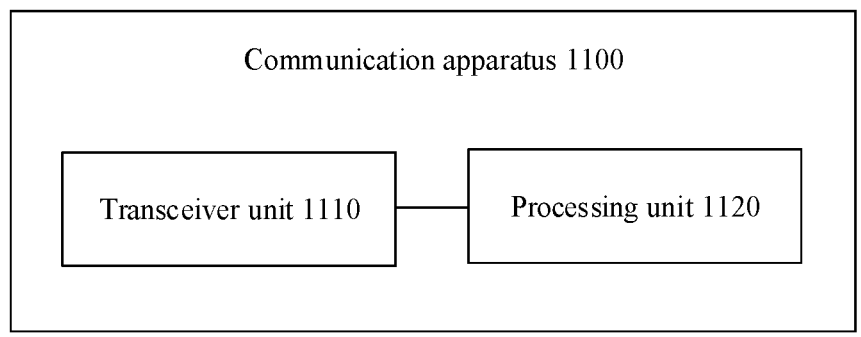
FIG. 11 is a schematic diagram of a structure of another communication apparatus according to an embodiment of this application.

An embodiment of this application further provides another communication apparatus. FIG. 11 is a schematic diagram of a structure of another communication apparatus according to an embodiment of this application. The communication apparatus 1100 includes a transceiver unit 1110 and a processing unit 1120. The communication apparatus may be configured to implement the function of the network device in any one of the foregoing method embodiments. For example, the communication apparatus may be a network device or a chip included in the network device, or the communication apparatus may be another combined device, a component, or the like that has the function of the foregoing network device. When the communication apparatus is the network device, the transceiver unit may be a transceiver, and may include an antenna, a radio frequency circuit, and the like, and the processing unit may be a processor, for example, a central processing unit (CPU). When the communication apparatus is the component having the function of the foregoing network device, the transceiver unit may be a radio frequency unit, and the processing unit may be a processor. When the communication apparatus is a chip system, the transceiver unit may be an input/output interface of the chip system, and the processing unit may be a processor of the chip system.

When the communication apparatus is used as the network device to perform the method embodiment shown in FIG. 2, the transceiver unit 1110 is configured to perform operations of sending the first data to the first terminal and the second terminal and receiving the second feedback information sent by the first terminal. The processing unit 1120 is configured to determine, based on the second feedback information, whether the second terminal needs to re-receive the first data.

It should be understood that the processing unit 1120 in the communication apparatus may be implemented by a processor or a processor-related circuit component, and the transceiver unit 1110 may be implemented by a transceiver or a transceiver-related circuit component. Operations and/or functions of the modules in the communication apparatus are respectively used to implement corresponding procedures of the methods shown in FIG. 2, and FIG. 7A and FIG. 7B. For example, in FIG. 2, the communication apparatus is used as the network device, and the transceiver unit 1110 may be configured to perform step S201 and step S206. For example, in FIG. 7A, if the communication apparatus is the second terminal, the transceiver unit 910 may be configured to perform step S701 and step S703. For brevity, examples are not enumerated one by one herein.

Figure 12:
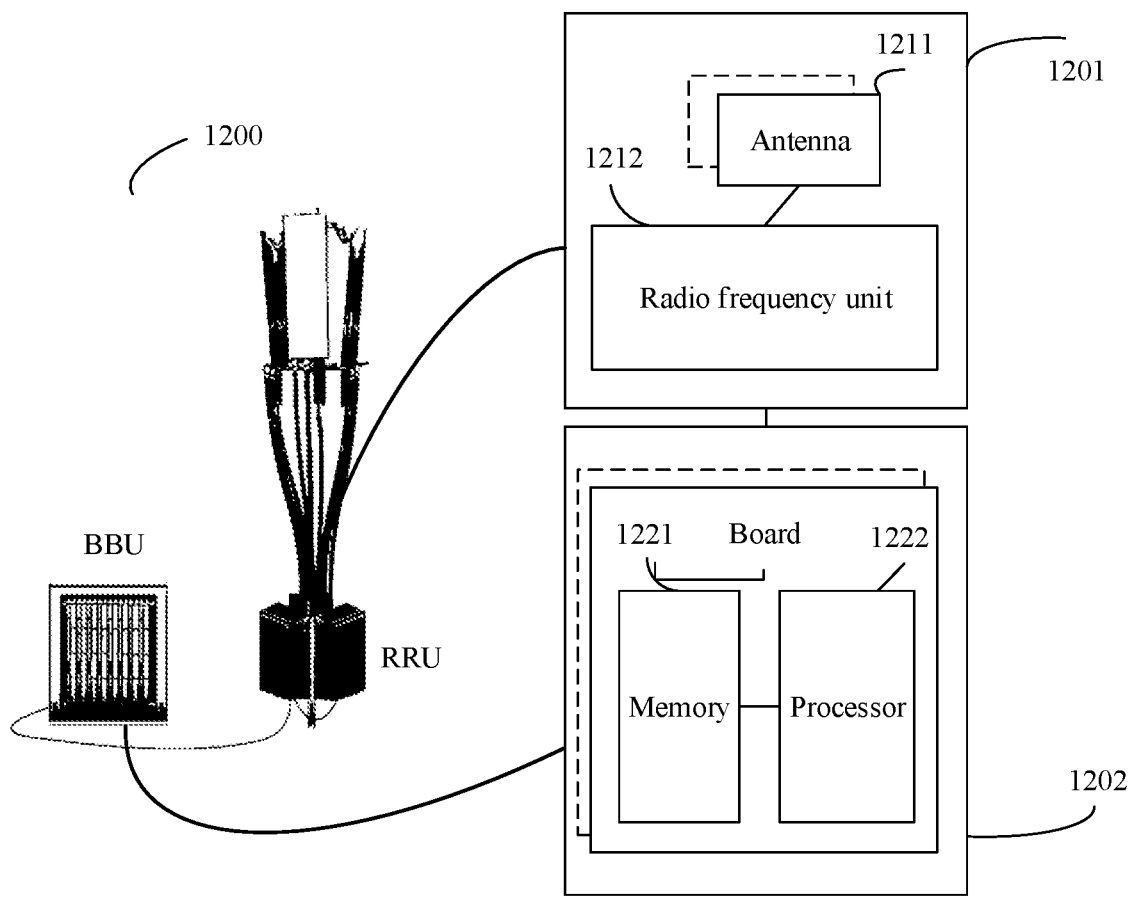
FIG. 12 is a schematic diagram of another structure of another communication apparatus according to an embodiment of this application.

FIG. 12 is a schematic diagram of another structure of another communication apparatus according to an embodiment of this application. The communication apparatus may be specifically a network device, for example, a base station, configured to implement the function of the network device in any one of the foregoing method embodiments.

The network device 1200 includes one or more radio frequency units such as a remote radio unit (RRU) 901 and one or more baseband units (BBU) (which may also be referred to as a digital unit, digital unit, DU) 902. The RRU 1201 may be referred to as a transceiver unit, a transceiver machine, a transceiver circuit, a transceiver, or the like, and may include at least one antenna 1211 and a radio frequency unit 1212. The RRU 1201 is partially configured to: perform radio frequency signal sending and receiving and perform conversion between a radio frequency signal and a baseband signal. The BBU 1202 is mainly configured to: perform baseband processing, control a base station, and the like. The RRU 1201 and the BBU 1202 may be physically disposed together, or may be physically disposed separately, to be specific, the base station is a distributed base station.

The BBU 1202 is a control center of the base station, may also be referred to as a processing unit, and is mainly configured to complete baseband processing functions such as channel encoding, multiplexing, modulation, and spectrum spreading. For example, the BBU (the processing unit) 1202 may be configured to control the base station to execute the operation procedure related to the network device in the foregoing method embodiments.

In an example, the BBU 1202 may include one or more boards. A plurality of boards may jointly support a radio access network (such as an LTE network) of a single access standard, or may separately support radio access networks (such as an LTE network, a 5G network, or another network) of different access standards. The BBU 1202 may further include a memory 1221 and a processor 1222. The memory 1221 is configured to store necessary instructions and data. The processor 1222 is configured to control the base station to perform a necessary action, for example, is configured to control the base station to perform a sending operation in the foregoing method embodiments. The memory 1221 and the processor 1222 may serve one or more boards. In other words, the memory and the processor may be separately disposed on each board. Alternatively, the plurality of boards may share a same memory and processor. In addition, a necessary circuit may be further disposed on each board.

An embodiment of this application further provides a chip system, including a processor, where the processor is coupled to a memory. The memory is configured to store a program or instructions. When the program or the instructions is/are executed by the processor, the chip system is enabled to implement the method in any one of the foregoing method embodiments.

Optionally, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor such as a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system on chip (SoC), a central processing unit (CPU), a network processor (NP), a digital signal processor (DSP), a micro controller unit (MCU), or a programmable logic device (PLD) or another integrated chip.

It should be understood that steps in the foregoing method embodiments can be completed by using a hardware integrated logical circuit in the processor or instructions in a form of software. The steps of the method disclosed with reference to embodiments of this application may be directly performed and completed by a hardware processor, or may be performed and completed by using a combination of hardware in the processor and a software module.

An embodiment of this application further provides a computer-readable storage medium. The computer storage medium stores computer-readable instructions. When a computer reads and executes the computer-readable instructions, the computer is enabled to perform the method in any one of the foregoing method embodiments.

An embodiment of this application further provides a computer program product. When a computer reads and executes the computer program product, the computer is enabled to perform the method in any one of the foregoing method embodiments.

An embodiment of this application further provides a communication system. The communication system includes a network device, a first terminal, and a second terminal.

It should be noted that the processor in embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose central processing unit (CPU), a general-purpose processor, digital signal processing (DSP), an application specific integrated circuit (ASIC), a field programmable gate array (FPGA), another programmable logic device, a transistor logic device, a hardware component, or any combination thereof, or may be a combination of processors implementing a computing function, for example, a combination of one or more microprocessors or a combination of a DSP and a microprocessor. The general-purpose processor may be a microprocessor, or the processor may be any conventional processor, or the like.

It may be understood that the memory or storage unit in embodiments of this application may be a volatile memory or a nonvolatile memory, or may include both a volatile memory and a nonvolatile memory. The nonvolatile memory may be the read-only memory (ROM), the programmable read-only memory (programmable ROM, PROM), an erasable programmable read-only memory (erasable PROM, EPROM), the electrically erasable programmable read-only memory (electrically EPROM, EEPROM), or the flash memory. The volatile memory may be the random access memory (RAM), used as an external cache. Through example but not limitative descriptions, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that, the memory in the system and method described in this specification includes but is not limited to these memories and any memory of another proper type.

All or some of the foregoing embodiments may be implemented by using software, hardware, firmware, or any combination thereof. When the software is used to implement the embodiments, all or a part of the embodiments may be implemented in a form of a computer program product. The computer program product includes one or more computer programs or instructions. When the computer programs or the instructions are loaded and executed on a computer, all or some of the procedures or functions in embodiments of this application are performed. The computer may be a general-purpose computer, a dedicated computer, a computer network, or another programmable apparatus. The computer programs or the instructions may be stored in the computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk drive, or a magnetic tape; or may be an optical medium, for example, a DVD; or may be a semiconductor medium, for example, a solid-state drive (SSD).

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk drive, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be arranged in the ASIC, and the ASIC may be arranged in a terminal device. Optionally, the processor and the storage medium may alternatively be arranged in different components of the terminal device.

These computer program instructions may alternatively be loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

It should be understood that "one embodiment" or "an embodiment" mentioned in the entire specification means that particular features, structures, or characteristics related to embodiments are included in at least one embodiment of this application. Therefore, "in an embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined based on functions and internal logic of the processes, but should not be construed as any limitation on the implementation processes in embodiments of this application.

In addition, the terms "system" and "network" are usually used interchangeably in this specification.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and unit, refer to a corresponding process in the method embodiment. Details are not described herein again.

In the several embodiments provided in this application, it should be understood that the disclosed system, the apparatus, and the method may be implemented in other manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments of this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in a computer-readable medium. The computer-readable medium includes a computer storage medium and a communication medium, and the communication medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can be used to carry or store expected program code in a form of instructions or a data structure and can be accessed by the computer. In addition, any connection may be properly defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong. A disk (Disk) and a disc used in this application include a compact disc (CD), a laser disc, an optical disc, a digital versatile disc (DVD), a floppy disk, and a Blu-ray disc, where the disk generally copies data in a magnetic manner, and the disc copies data optically in a laser manner. The foregoing combination shall also be included in the protection scope of the computer-readable medium.

It is clear that a person skilled in the art can make various modifications and variations to this application without departing from the scope of this application. In this way, if these modifications and variations to this application fall within the scope of the claims of this application and their equivalent technologies, this application is also intended to cover these modifications and variations.

What is claimed is:

1. A data feedback method carried out by a first terminal, the method comprising:
receiving first feedback information from a second terminal, wherein the first feedback information is used to indicate a receiving result of the second terminal for first data from a network device, wherein the first data is sent by the network device for the second terminal; and
sending second feedback information to the network device, wherein the second feedback information is determined by the first terminal based on the first feedback information and a receiving result of the first terminal for the first data,
wherein the receiving first feedback information from a second terminal comprises:
receiving sidelink (SL) resource configuration information from the network device,
determining an SL resource based on the SL resource configuration information; and
receiving the first feedback information from the second terminal by using the SL resource.

2. The method of claim 1, wherein the receiving result of the first terminal for the first data comprises at least one receiving result taken from the group consisting of:
the first terminal successfully receiving the first data; and
the first terminal not successfully receiving the first data.

3. The method according to claim 1, wherein the second feedback information is a bit position comprising at least two bits, wherein at least one bit of the bit position is used to indicate the receiving result of the first terminal for the first data, and another at least one bit of the bit position is used to indicate the receiving result of the second terminal for the first data.

4. The method according to claim 1, wherein the second feedback information is an index corresponding to a combination of:
the receiving result of the second terminal for the first data, and
the receiving result of the first terminal for the first data; and
wherein the method further comprises:
determining, based on a first correspondence, an index value corresponding to a combination of the receiving result of the first terminal for the first data and the receiving result of the second terminal for the first data,
wherein the first correspondence comprises a correspondence between each index and each combination of a possible receiving result of the first terminal and a possible receiving result of the second terminal.

5. A data feedback method carried out by a second terminal, the method comprising:
receiving first data from a network device; and
sending first feedback information to a first terminal, wherein the first feedback information is used to indicate a receiving result of the second terminal for the first data, the first terminal is a cooperation terminal of the second terminal, and a destination end of the first data is the second terminal,
wherein, before the sending first feedback information to a first terminal, the method further comprises:
receiving sidelink (SL) resource configuration information from the network device, and
determining an SL resource based on the SL resource configuration information; and
wherein the sending first feedback information to a first terminal comprises sending the first feedback information to the first terminal by using the SL resource.

6. The method of claim 5, wherein the receiving result of the second terminal for the first data comprises at least one receiving result taken from the group consisting of:
the second terminal successfully receiving the first data; and
the second terminal not successfully receiving the first data.

7. A data feedback method carried out by a network device, the method comprising:
sending first data, wherein a destination end of the first data is a second terminal; and
receiving second feedback information of a first terminal, wherein the second feedback information is determined by the first terminal based on first feedback information sent by the second terminal to the first terminal and a receiving result of the first terminal for the first data, and the first feedback information is used to indicate a receiving result of the second terminal for the first data,
wherein the method further comprises sending sidelink (SL) resource configuration information to the first terminal and the second terminal, wherein the SL resource configuration information is used to indicate a first time interval of an SL resource that is used to carry the first feedback information,
wherein the first time interval is an interval between:
a time domain position of the first data and a time domain position of the SL resource,
a time domain position of the SL resource configuration information and a time domain position of the SL resource, or
a time domain position of scheduling information of the first data and a time domain position of the SL resource.

8. The method of claim 7, wherein the receiving result of the second terminal for the first data comprises at least one receiving result taken from the group consisting of:
the second terminal successfully receiving the first data; and
the second terminal not successfully receiving the first data.

9. A communication apparatus, wherein the apparatus comprises:
a processor; and
a non-transitory computer-readable medium including instructions that, when executed by the processor, facilitate carrying out a method comprising:
receiving first feedback information from a second terminal, wherein the first feedback information is used to indicate a receiving result of the second terminal for first data from a network device, wherein the first data is sent by the network device for the second terminal; and
sending second feedback information to the network device, wherein the second feedback information is determined by the communication apparatus based on the first feedback information and a receiving result of the communication apparatus for the first data,
wherein the receiving first feedback information from a second terminal comprises:
receiving sidelink (SL) resource configuration information from the network device,
determining an SL resource based on the SL resource configuration information; and receiving the first feedback information from the second terminal by using the SL resource.

10. The communication apparatus according to claim 9, wherein the receiving result of the communication apparatus for the first data comprises at least one receiving result taken from the group consisting of:
the first terminal successfully receiving the first data; and
the first terminal not successfully receiving the first data.

11. The communication apparatus according to claim 9, wherein the second feedback information is a bit position comprising at least two bits, wherein at least one bit of the bit position is used to indicate the receiving result of the communication apparatus for the first data, and another at least one bit of the bit position is used to indicate the receiving result of the second terminal for the first data.

12. The communication apparatus according to claim 9, wherein the second feedback information is an index corresponding to a combination of the receiving result of the second terminal for the first data and the receiving result of the first terminal for the first data, and
wherein the method further comprises:
determining, based on a first correspondence, an index value corresponding to a combination of the receiving result of the communication apparatus for the first data and the receiving result of the second terminal for the first data,
wherein the first correspondence comprises a correspondence between each index and each combination of a possible receiving result of the communication apparatus and a possible receiving result of the second terminal.

13. A communication apparatus, wherein the apparatus comprises;
a processor; and
a non-transitory computer-readable medium including instructions that, when executed by the processor, facilitate carrying out a method comprising:
receiving first data from a network device; and
sending first feedback information to a first terminal, wherein the first feedback information is used to indicate a receiving result of the communication apparatus for the first data, the first terminal is a cooperation terminal of the communication apparatus, and a destination end of the first data is the communication apparatus,
wherein, before the sending first feedback information to a first terminal, the method further comprises:
receiving sidelink (SL) resource configuration information from the network device, and
determining an SL resource based on the SL resource configuration information; and
wherein the sending first feedback information to a first terminal comprises sending the first feedback information to the first terminal by using the SL resource.

14. The communication apparatus according to claim 13, wherein the receiving result of the communication apparatus for the first data comprises at least one receiving result taken from the group consisting of:
the communication apparatus successfully receiving the first data; and
the communication apparatus not successfully receiving the first data.

15. A communication apparatus, wherein the apparatus comprises;
a processor; and
a non-transitory computer-readable medium including instructions that, when executed by the processor, facilitate carrying out a method comprising:
sending first data, wherein a destination end of the first data is a second terminal; and
receiving second feedback information of a first terminal, wherein the second feedback information is determined by the first terminal based on first feedback information sent by the second terminal to the first terminal and a receiving result of the first terminal for the first data, and the first feedback information is used to indicate a receiving result of the second terminal for the first data,
wherein the method further comprises sending sidelink (SL) resource configuration information to the first terminal and the second terminal, wherein the SL resource configuration information is used to indicate a first time interval of an SL resource that is used to carry the first feedback information,
wherein the first time interval is an interval between:
a time domain position of the first data and a time domain position of the SL resource,
a time domain position of the SL resource configuration information and a time domain position of the SL resource, or
a time domain position of scheduling information of the first data and a time domain position of the SL resource.

16. The apparatus according to claim 15, wherein the receiving result of the second terminal for the first data comprises at least one receiving result taken from the group consisting of:
the second terminal successfully receiving the first data; and
the second terminal not successfully receiving the first data.

* * * * *